US012580858B2

(12) United States Patent
Huang

(10) Patent No.: US 12,580,858 B2
(45) Date of Patent: Mar. 17, 2026

(54) ACCELERATED DATA TRANSMISSION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Haitao Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 356 days.

(21) Appl. No.: 18/314,497

(22) Filed: May 9, 2023

(65) Prior Publication Data

US 2023/0275836 A1     Aug. 31, 2023

Related U.S. Application Data

(63) Continuation of application No. PCT/CN2022/110123, filed on Aug. 4, 2022.

(30) Foreign Application Priority Data

Sep. 8, 2021     (CN) .......................... 202111049966.0

(51) Int. Cl.
H04L 45/745          (2022.01)
H04L 61/4511         (2022.01)

(52) U.S. Cl.
CPC ........ H04L 45/745 (2013.01); H04L 61/4511 (2022.05)

(58) Field of Classification Search
CPC ... H04L 45/745; H04L 61/4511; H04L 45/74; H04L 41/083
See application file for complete search history.

(56) References Cited

U.S. PATENT DOCUMENTS

2018/0367648 A1     12/2018   Fan et al.
2021/0021518 A1*     1/2021   Chand ................... H04L 45/021
(Continued)

FOREIGN PATENT DOCUMENTS

CN          104580192 A      4/2015
CN          105791315 A      7/2016
(Continued)

OTHER PUBLICATIONS

The World Intellectual Property Organization (WIPO) International Search Report for PCT/CN2022/110123 Oct. 26, 2022 8 Pages (including translation).

*Primary Examiner* — Yaotang Wang
(74) *Attorney, Agent, or Firm* — Anova Law Group, PLLC

(57)     ABSTRACT

This application relates to an accelerated data transmission method and apparatus, a computer device, a computer-readable storage medium, and a computer program product. The method includes routing a data packet transmitted by an application client of an application to be accelerated to a virtual network device; retrieving a network layer data packet from the virtual network device; taking an address of an acceleration server associated with the application client as an updated access address of the network layer data packet, and adding the original access address to the data segment to obtain an updated data packet; and transmitting the updated data packet to the acceleration server, the acceleration server accessing an application server corresponding to the original access address, and sending a response data packet returned by the acceleration server to the application client.

19 Claims, 9 Drawing Sheets

(56) References Cited

U.S. PATENT DOCUMENTS

| | | | |
|---|---|---|---|
| 2023/0275836 A1 | 8/2023 | Huang | |
| 2023/0321530 A1* | 10/2023 | Yang .................... | A63F 13/352 |
| 2023/0388394 A1* | 11/2023 | Pilkauskas ........... | H04L 67/561 |

FOREIGN PATENT DOCUMENTS

| | | | | |
|---|---|---|---|---|
| CN | 110478897 A | | 11/2019 | |
| CN | 111800330 A | * | 10/2020 | ........... H04L 67/562 |
| CN | 112152828 A | | 12/2020 | |
| CN | 112245907 A | | 1/2021 | |
| CN | 113507393 A | | 10/2021 | |
| WO | 2019043687 A2 | | 3/2019 | |

* cited by examiner

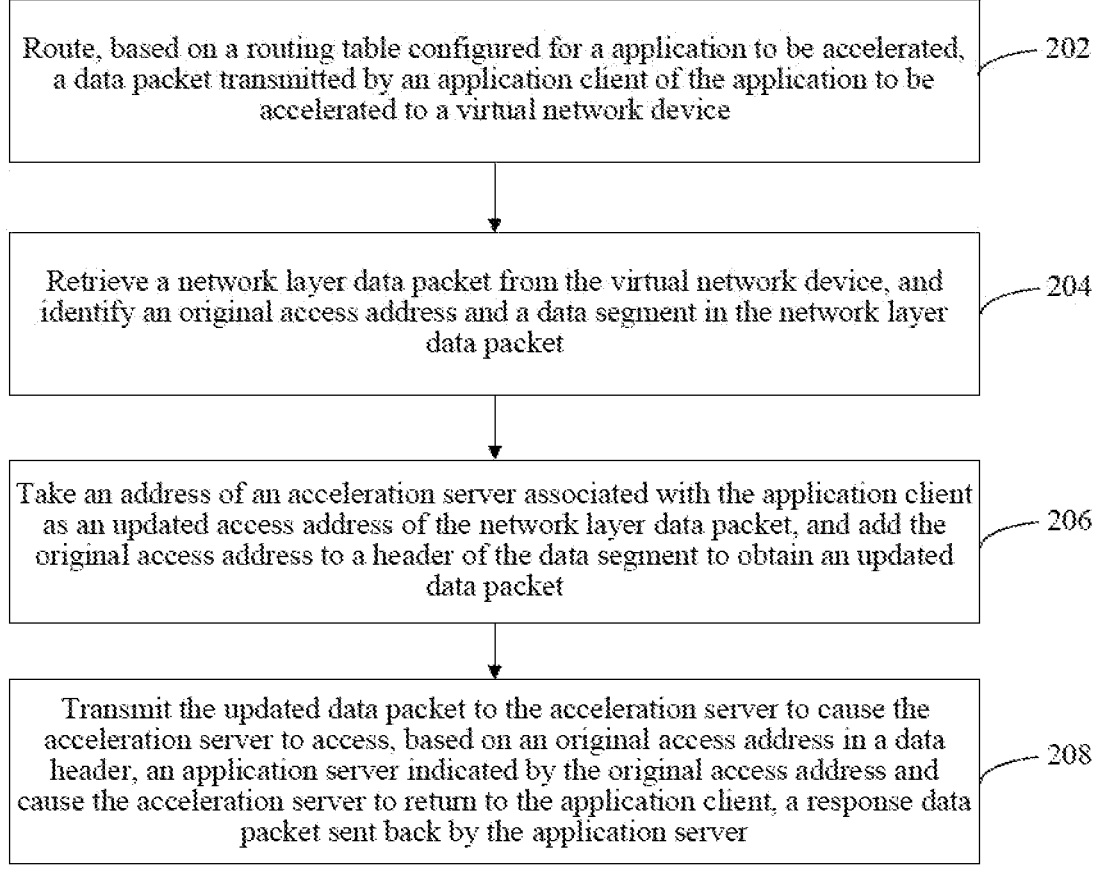

Route, based on a routing table configured for a application to be accelerated, a data packet transmitted by an application client of the application to be accelerated to a virtual network device — 202

Retrieve a network layer data packet from the virtual network device, and identify an original access address and a data segment in the network layer data packet — 204

Take an address of an acceleration server associated with the application client as an updated access address of the network layer data packet, and add the original access address to a header of the data segment to obtain an updated data packet — 206

Transmit the updated data packet to the acceleration server to cause the acceleration server to access, based on an original access address in a data header, an application server indicated by the original access address and cause the acceleration server to return to the application client, a response data packet sent back by the application server — 208

FIG. 2

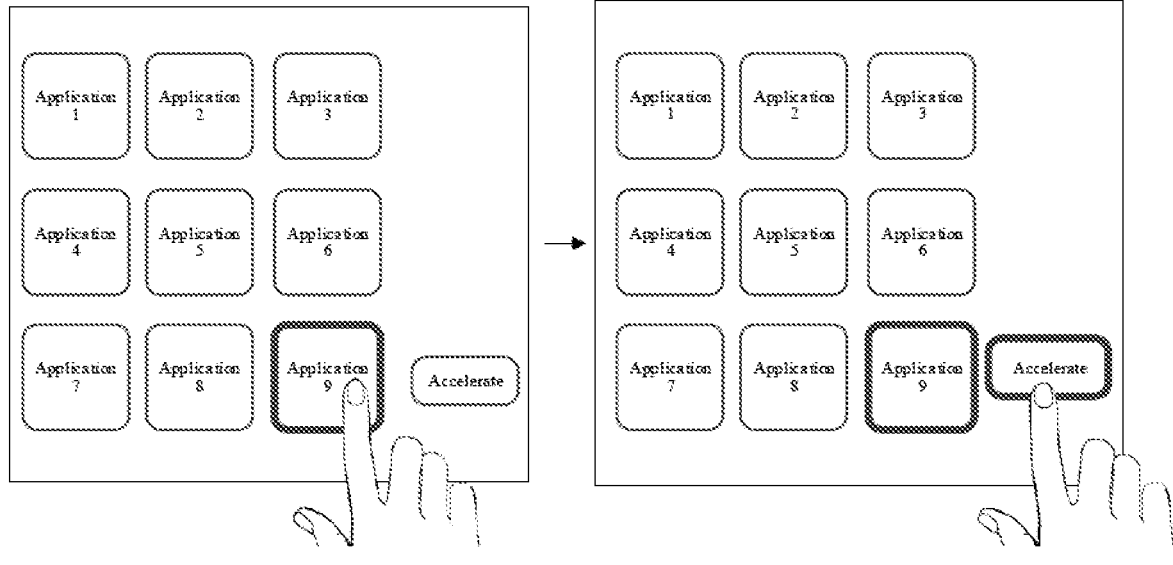

FIG. 3

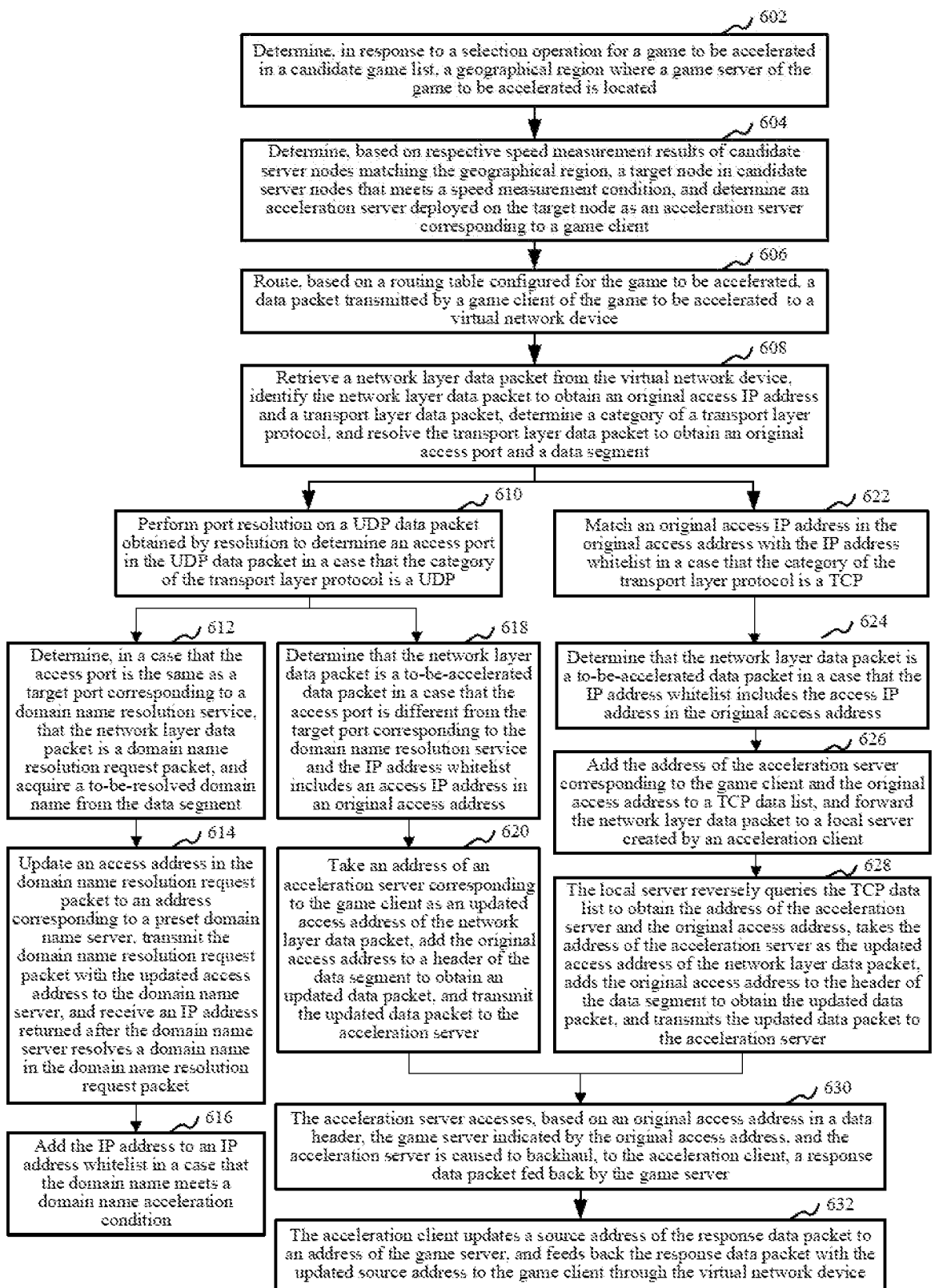

602

Determine, in response to a selection operation for a game to be accelerated in a candidate game list, a geographical region where a game server of the game to be accelerated is located

604

Determine, based on respective speed measurement results of candidate server nodes matching the geographical region, a target node in candidate server nodes that meets a speed measurement condition, and determine an acceleration server deployed on the target node as an acceleration server corresponding to a game client

606

Route, based on a routing table configured for the game to be accelerated, a data packet transmitted by a game client of the game to be accelerated to a virtual network device

608

Retrieve a network layer data packet from the virtual network device, identify the network layer data packet to obtain an original access IP address and a transport layer data packet, determine a category of a transport layer protocol, and resolve the transport layer data packet to obtain an original access port and a data segment

610

Perform port resolution on a UDP data packet obtained by resolution to determine an access port in the UDP data packet in a case that the category of the transport layer protocol is a UDP

622

Match an original access IP address in the original access address with the IP address whitelist in a case that the category of the transport layer protocol is a TCP

612

Determine, in a case that the access port is the same as a target port corresponding to a domain name resolution service, that the network layer data packet is a domain name resolution request packet, and acquire a to-be-resolved domain name from the data segment

618

Determine that the network layer data packet is a to-be-accelerated data packet in a case that the access port is different from the target port corresponding to the domain name resolution service and the IP address whitelist includes an access IP address in an original access address

624

Determine that the network layer data packet is a to-be-accelerated data packet in a case that the IP address whitelist includes the access IP address in the original access address

626

Add the address of the acceleration server corresponding to the game client and the original access address to a TCP data list, and forward the network layer data packet to a local server created by an acceleration client

614

Update an access address in the domain name resolution request packet to an address corresponding to a preset domain name server, transmit the domain name resolution request packet with the updated access address to the domain name server, and receive an IP address returned after the domain name server resolves a domain name in the domain name resolution request packet

620

Take an address of an acceleration server corresponding to the game client as an updated access address of the network layer data packet, add the original access address to a header of the data segment to obtain an updated data packet, and transmit the updated data packet to the acceleration server

628

The local server reversely queries the TCP data list to obtain the address of the acceleration server and the original access address, takes the address of the acceleration server as the updated access address of the network layer data packet, adds the original access address to the header of the data segment to obtain the updated data packet, and transmits the updated data packet to the acceleration server

616

Add the IP address to an IP address whitelist in a case that the domain name meets a domain name acceleration condition

630

The acceleration server accesses, based on an original access address in a data header, the game server indicated by the original access address, and the acceleration server is caused to backhaul, to the acceleration client, a response data packet fed back by the game server

632

The acceleration client updates a source address of the response data packet to an address of the game server, and feeds back the response data packet with the updated source address to the game client through the virtual network device

FIG. 6

ACCELERATED DATA TRANSMISSION METHOD AND APPARATUS, COMPUTER DEVICE, AND STORAGE MEDIUM

RELATED APPLICATIONS

This application is a continuation of PCT Application No. PCT/CN2022/110123, filed on Aug. 4, 2022, which in turn claims priority to Chinese Patent Application No. 202111049966.0, entitled "ACCELERATED DATA TRANSMISSION METHOD AND APPARATUS, COMPUTER DEVICE, AND STORAGE MEDIUM" filed with the China Patent Office on Sep. 8, 2021. The two applications are both incorporated herein by reference in their entirety.

FIELD OF THE TECHNOLOGY

This application relates to the field of data transmission technologies, and in particular, to an accelerated data transmission method and apparatus, a computer device, a computer-readable storage medium, and a computer program product.

BACKGROUND OF THE DISCLOSURE

With the development of Internet technologies, fast and secure data transmission has become an important requirement during data interaction. Taking a game scene as an example, in the case of a bad network environment, problems such as domain name system (DNS) hijacking and line congestion often arise, which may most likely lead to problems such as game disconnection, a long delay, and impossible to log in. Such problems seriously affect users' game experience. In order to solve this problem, data transmission by using a virtual private network (VPN) is proposed. Through establishing an encrypted connection with a VPN server based on a private protocol, the VPN server, after receiving data, needs to decrypt the data and then use a normal transmission control protocol (TCP)/ Internet protocol (IP) to establish a connection with a real game server. After receiving real game data, the VPN server may encrypt the game data and transmit the encrypted game data back to a client.

However, the client needs to use a private protocol for communication when establishing a connection with the VPN server, and both the client and the server need encryption and decryption. Encryption and decryption may affect performance of the VPN server, increase the delay required for communication, lead to low data processing efficiency of the server, and impair the effect of accelerated data transmission.

SUMMARY

Embodiments of this application provide an accelerated data transmission method and apparatus, a computer device, a computer-readable storage medium, and a computer program product.

One aspect of this disclosure provides an accelerated data transmission method, performed by one or more processors. The method includes routing a data packet transmitted by an application client of an application to be accelerated to a virtual network device based on a routing table configured for the application to be accelerated; retrieving a network layer data packet from the virtual network device, and identifying an original access address and a data segment in the network layer data packet; taking an address of an acceleration server associated with the application client as an updated access address of the network layer data packet, and adding the original access address to the data segment to obtain an updated network layer data packet; and transmitting the updated network layer data packet to the acceleration server, the acceleration server accessing an application server corresponding to the original access address in the data header, and sending a response data packet returned by the acceleration server to the application client.

A computer device, including a memory and one or more processors, the memory storing a computer-readable instruction, the computer-readable instruction, when executed by the one or more processors, causing the one or more processors to perform steps of the above accelerated data transmission method.

One or more non-transitory computer-readable storage media storing computer-readable instructions, the computer-readable instructions, when executed by one or more processors, causing the one or more processors to perform steps of the above accelerated data transmission method.

Details of one or more embodiments of this application are provided in the accompanying drawings and descriptions below. Other features and advantages of this application become obvious with reference to the specification, the accompanying drawings, and the claims.

BRIEF DESCRIPTION OF THE DRAWINGS

To describe the technical solutions in the embodiments of this application or in the related art more clearly, the following briefly introduces the accompanying drawings for describing the embodiments or the related art. Apparently, the accompanying drawings in the following description show merely some embodiments of this application, and a person of ordinary skill in the art may still derive other drawings from the accompanying drawings without creative efforts.

FIG. 2 is a schematic flowchart of an accelerated data transmission method according to an embodiment.

FIG. 3 is a schematic diagram of a page for selecting an application to be accelerated according to an embodiment.

FIG. 6 is a schematic flowchart of an accelerated data transmission method according to another embodiment.

DESCRIPTION OF EMBODIMENTS

To make the objectives, technical solutions, and advantages of this application clearer, the following further describes this application in detail with reference to the accompanying drawings and embodiments. It is to be understood that the specific embodiments described herein are only used for explaining this application, and are not used for limiting this application.

Figure 1:
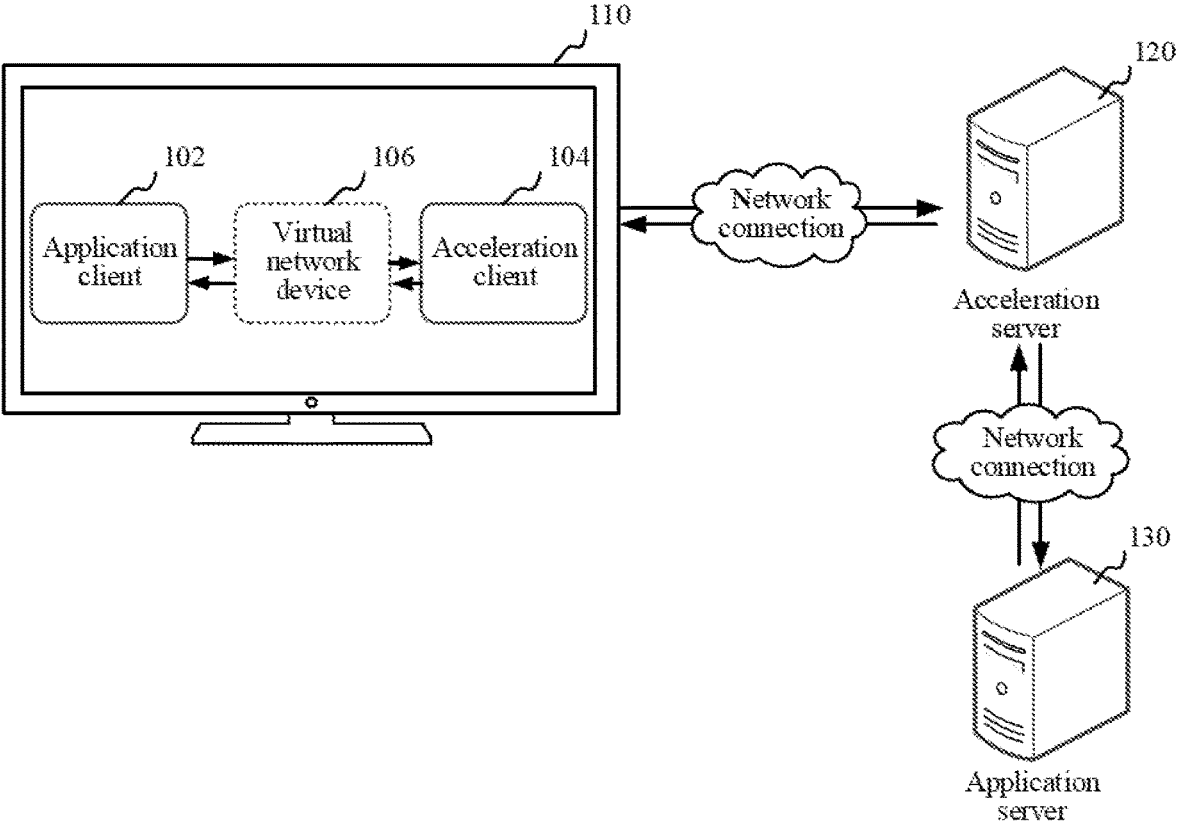
FIG. 1 is a diagram of an application environment of an accelerated data transmission method according to an embodiment.

An accelerated data processing apparatus according to this application can be implemented in the environment shown in FIG. 1. Terminal 110 communicates with an acceleration server 120 through a network, and the acceleration server 120 communicates with an application server 130 through the network. The terminal includes an application client 102, an acceleration client 104, and a virtual network device 106 created by the acceleration client 104. The terminal 102 routes, based on a routing table, a data packet transmitted by the application client 102 of an application to be accelerated to the virtual network device 106. The routing table is configured by the acceleration client 104 for the application to be accelerated. The acceleration client 104 reads a network layer data packet from the virtual network device 106, and resolves an original access address and a data segment in the network layer data packet. The acceleration client 104 takes an address of the acceleration server 120 corresponding to the application client 102 as an updated access address of the network layer data packet, and adds the original access address to a header of the data segment to obtain an updated data packet. The acceleration client 104 transmits the updated data packet to the acceleration server 120. The acceleration server 120 accesses, based on an original access address in a data header, the application server 130 indicated by the original access address, and the acceleration server is caused to backhaul, to the acceleration client 104, a response data packet fed back by the application server 130. The acceleration client 104 updates a source address of the response data packet to an address of the application server, and feeds back the response data packet with the updated source address to the application client 102 through the virtual network device 106.

The terminal 110 may be, but is not limited to, various personal computers, notebook computers, smart phones, tablet computers, portable wearable devices, and vehicle-mounted terminals. Both the acceleration server 120 and the application server 140 may be realized by a standalone server or a server cluster formed by a plurality of servers.

In one embodiment, as shown in FIG. 2, an accelerated data transmission method is provided. For example, the method is applied to the acceleration client in FIG. 1, and includes the following steps:

Step 202: Route, based on a routing table configured for an application to be accelerated, a data packet transmitted by an application client of the application to be accelerated to a virtual network device.

Accelerated data transmission is a data processing manner of improving efficiency of data transmission and reducing data delays. A process of data interaction, affected by a network environment, is prone to line congestion and other situations, resulting in problems such as a high interaction delay. Through accelerated data transmission, efficiency of data interaction can be improved.

The application to be accelerated is an application program that needs to perform data interaction with a server through a network. During the data interaction, the application to be accelerated exists in the form of a specific application client in a terminal. The application client refers to a program corresponding to a server and providing a local service for a customer. The application client may specifically be an application program downloaded by a terminal and configured to perform data interaction based on a network, or a specific web page for data access based on a browser. In one embodiment, the application to be accelerated may be a game application to achieve a rapid response during game interaction. Alternatively, the application to be accelerated may be an electronic map application, such as a navigation application, to realize rapid acquisition of at least one of map data and navigation data.

The routing table is a data table that records transmission paths and receiving objects of data packets. Generally, the application client may specify an access address when performing data interaction. An original routing table in the terminal is used for recording a transmission path of the application client, so that the terminal transmits data traffic to the specified access address.

According to the routing table configured for the application to be accelerated, the data packet transmitted by the application client of the application to be accelerated can be routed to the virtual network device to realize interception of the data packet. Routing refers to a data transmission process from a source object to an access object.

The configuration of the routing table is essentially to modify transmission paths and receiving objects in the original routing table. In one embodiment, the acceleration client configures the routing table in response to an acceleration request for the application to be accelerated, so that the data packet transmitted by the application client of the application to be accelerated can be routed to the virtual network device based on the configured routing table. The acceleration request is used for requesting the acceleration client to accelerate data traffic transmitted by the application to be accelerated to improve efficiency of interaction between the application client of the application to be accelerated and the application server.

The data packet refers to a data unit corresponding to interaction data that the application client needs to transmit to the corresponding application server. During the data interaction, a single message is divided into a plurality of data blocks, and each data block obtained by division is called a data packet, and the data packet includes address information of a sender and address information of a receiver. These data packets are then transmitted along different paths in one or more networks, and recombined at an access destination to realize data interaction.

The virtual network device refers to a virtual network device in a kernel of an operating system. The virtual network device is configured to assist the acceleration client to transmit and receive data packets. The acceleration client may read input data packets from the virtual network device, and may also write data packets to the virtual network devices and transmit the data packets. The virtual network device is implemented with software and provides exactly the same function as a hardware network device for software running on the operating system. The virtual network device is a software device created by the application client in the kernel of the operating system. The virtual network device may always exist in the kernel of the operating system after creation to reduce the creation process of the virtual network device and increase the processing speed. The virtual network device may also be released each time the virtual network device completes application acceleration, and recreated in next accelerated data transmission, to reduce occupation of a space of the kernel of the operating system when accelerated data transmission is not required. In one embodiment, the virtual network device may be created by the acceleration client in response to the acceleration request for the application to be accelerated.

In one embodiment, the acceleration client configures, in response to the acceleration request for the application to be accelerated, a routing table causing the data packet transmitted by the application client of the application to be accelerated to be routed to the virtual network device, so that the data packet transmitted by the application client of the application to be accelerated is routed to the virtual network device according to the routing table. Through the configuration of the routing table in response to the acceleration request, configuration time of the routing table and a manner of triggering the action of configuring the routing table can be clarified, thereby increasing a response speed of transmission acceleration for the application to be accelerated.

In one embodiment, as shown in FIG. 3, a plurality of candidate application identifiers is displayed on an operating page of the acceleration client. In response to a user selecting an identifier for the application to be accelerated from the candidate application identifiers, the acceleration client is configured to determine a selected application to be accelerated. When the user selects the identifier for the application to be accelerated, an acceleration request for the selected application to be accelerated is triggered in the case of the user's operation of triggering a displayed acceleration request trigger entry. The acceleration client creates the virtual network device in response to the acceleration request for the application to be accelerated, and then configures the routing table based on the virtual network device, so that the data packet transmitted by the application client can be routed to the virtual network device through the routing table. Further, candidate application identifiers that can be accelerated are displayed on the operating page of the acceleration client when the user starts the acceleration client on the terminal. Application 1 to Application 9 as shown in FIG. 3 are candidate application identifiers corresponding to applications that can be accelerated. When the user wants to accelerate one of the applications, for example, Application 9, the user clicks an application identifier corresponding to Application 9, and the application identifier corresponding to Application 9 changes from an unselected state to a selected state. The selected state and the unselected state may be distinguished in different display manners such as different border colors/different icon sizes. The user, after selecting the identifier for the application to be accelerated, triggers the acceleration request for the selected application to be accelerated. In one embodiment, the acceleration request trigger entry is further displayed on the operating page of the acceleration client. The user, after selecting the identifier for the application to be accelerated, may trigger, through the operation of triggering the acceleration request trigger entry, an acceleration request for Application 9 represented by the identifier for the application to be accelerated. The acceleration client creates the virtual network device in the kernel of the operating system in response to the user's acceleration request for the application to be accelerated, and then configures the routing table based on the virtual network device, so that the data packet transmitted by the application client after the application client starts can be routed to the virtual network device based on the routing table to perform a subsequent accelerated transmission process.

In one embodiment, in a game scene, the candidate application identifiers may be icons corresponding to candidate game applications. A plurality of game icons that can be accelerated are displayed on the operating page of the acceleration client. The user, when wanting to accelerate a game, may open the acceleration client, and after directly selecting the game in a game application icon display region or directly searching and selecting the game by entering a game name, the user clicks the displayed acceleration request trigger entry to trigger an acceleration request for the game. The acceleration client performs, in response to the user's operation of triggering the acceleration request trigger entry after the selection of the game icon, accelerated transmission on a data packet transmitted by a game application corresponding to the game icon, so that the user can select an application to be accelerated on a display page of the acceleration client to quickly and conveniently select the application to be accelerated, such as a game to be accelerated.

Step 204: Read a network layer data packet from the virtual network device, and resolve an original access address and a data segment in the network layer data packet.

The network layer data packet refers to a data packet acquired from a network layer, and the network layer data packet is also called a datagram. The datagram is a form of packet switching, in which transmitted data is segmented and then packaged separately and transmitted as an independent message. During the transmission of the datagram, the network layer is configured to process a packet transmission request from a transport layer, load, after receiving the packet transmission request, packet information into an IP datagram, fill a header, select a path to a terminal or server corresponding to an access address, and then transmit the datagram to an appropriate network interface. During the receiving of the datagram, the network layer also processes an inputted datagram, first checks validity of the inputted datagram, then performs routing, and removes the header and processes the rest according to an appropriate transport protocol if the datagram has arrived at the terminal or server corresponding to the access address. The datagram is forwarded if the datagram has not arrived at the terminal or server corresponding to the access address. Each datagram has two parts, namely a header and a message. The header includes necessary content such as an access address, so that each datagram can accurately arrive at an access destination without going through the same path. Content in the datagram is restored to originally transmitted data by recombination at an access place, and the access address can be acquired from the header by identifying the network layer data packet.

The original access address refers to an address of a server that needs to perform data interaction with the application client, such as an application server. A quantity of the application server corresponding to the application client may be one, or two or more, which may specifically be determined according to backend configuration data of the application to be accelerated. The data packet transmitted by the application client includes a data packet requesting domain name resolution and a data packet requesting interaction. An address resolved from the data packet requesting interaction is the original access address.

In an embodiment, the original access address includes an original access IP address and an original access port. The identifying an original access address and a data segment in the network layer data packet includes:

identifying the network layer data packet to obtain the original access IP address and a transport layer data packet; and identifying the transport layer data packet to obtain the original access port and the data segment.

Figure 4:
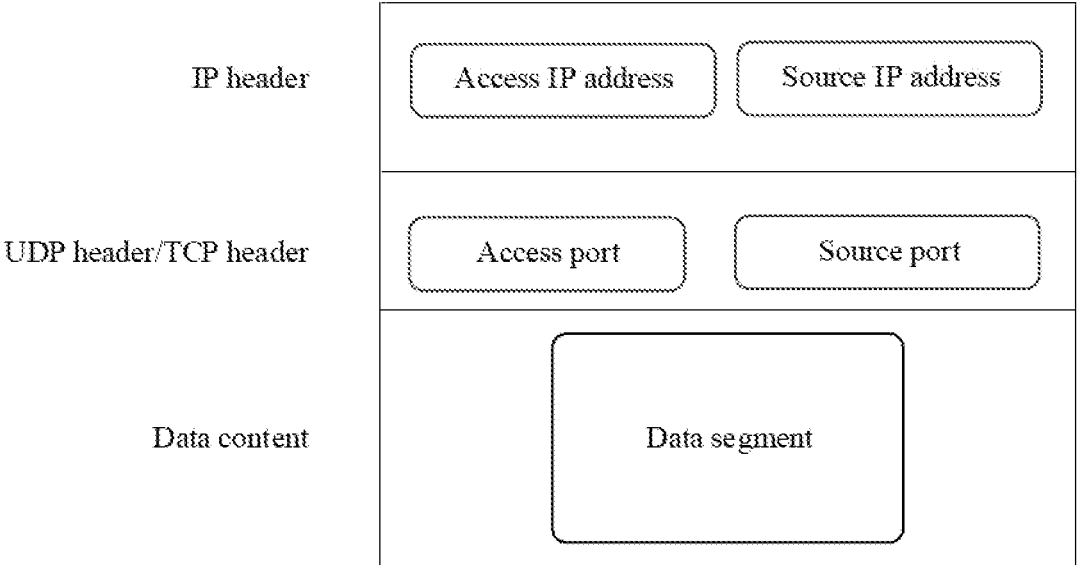
FIG. 4 is a schematic diagram of a resolution result of a network layer data packet according to another embodiment.

The data segment refers to data content of the transport layer data packet obtained after the network layer data packet is resolved. In one embodiment, as shown in FIG. 4, the network layer data packet is resolved, and an IP header and a transport layer data packet may be obtained. The IP header includes an access IP address. The transport layer data packet is divided into a TCP data packet and a UDP data packet. The transport layer data packet is resolved, and a TCP header/UDP header and a data segment may be obtained. The TCP header/UDP header includes an access port, and an access address is formed by the access IP address and the access port.

Since the data packet of the application client is transmitted based on the routing table, an operating system of the terminal may route the data packet of the application client to the virtual network device based on the configured routing table, and the acceleration client acquires a file descriptor of the virtual network device. The file descriptor is an index to access a file or data. The network layer data packet is read from the virtual network device to the acceleration client based on the file descriptor. In the acceleration client, the network layer data packet is resolved, the network layer data packet is split into a header and a message, and the original access address is acquired from the header.

Step 206: Take an address of an acceleration server associated with the application client as an updated access address of the network layer data packet, and add the original access address to a header of the data segment to obtain an updated data packet.

The acceleration server is an intermediate node in a data transmission link, and is respectively connected to the application client, the terminal where the acceleration client is located, and the application server. Through the acceleration server, the quantity of network nodes passed through during data transmission can be significantly reduced, thereby improving efficiency of data transmission and realizing accelerated data transmission. The address of the acceleration server includes an IP address and a port number of the acceleration server. Accurate network connection and data interaction can be realized based on the IP address and the port number. The updated access address refers to a result of updating the original access address of the network layer data packet. Through the updated access address, the network layer data packet can be transmitted to the acceleration server corresponding to the updated access address.

The header of the data segment refers to a frontmost position of data content of the transport layer data packet. The header of the data segment is content of the data segment that can be identified and extracted by the acceleration server. The content added to the header of the data segment includes the original access IP address and the original access port that correspond to the original access address. In addition, the content added to the header of the data segment may also include related information corresponding to the application to be accelerated, which may specifically be configured according to an interaction requirement.

Figure 5:
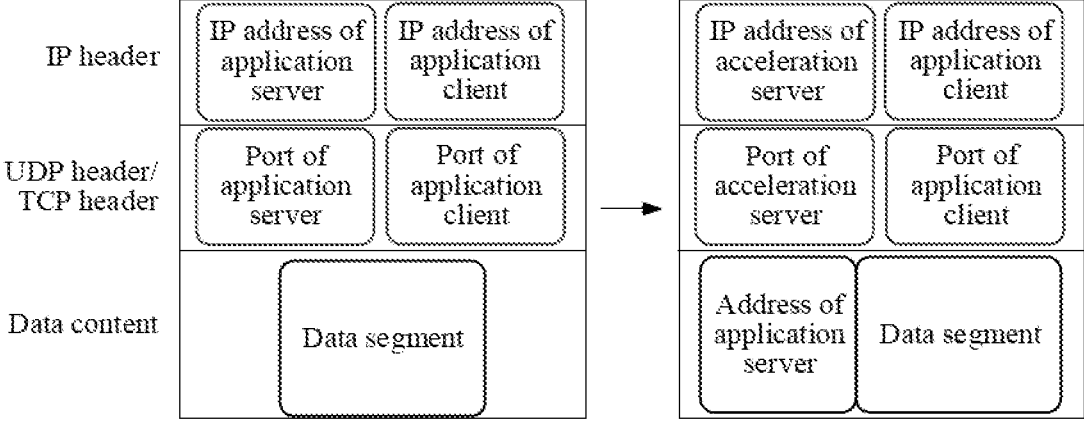
FIG. 5 is schematic diagram of comparison between network layer data packets before and after update according to an embodiment.

The updated data packet is essentially an update of data packets corresponding to the transport layer and the network layer. As shown in FIG. 5, specific update content includes update of data segment content of the transport layer (content of the header of the data segment is added), update of the access port in a transport layer data header, namely the TCP header/UDP header, and update of the access IP address in a network layer data header, namely the IP header. During the transmission to the acceleration server corresponding to the updated access address, the updated data packet also needs to be processed by a link layer and a physical layer, which is not expansively described herein since this application does not relate to improvement of processing processes of the link layer and the physical layer.

Step 208: Transmit the updated data packet to the acceleration server to cause the acceleration server to access, based on an original access address in a data header, an application server indicated by the original access address and cause the acceleration server to backhaul, to the application client, a response data packet fed back by the application server.

The acceleration server is an intermediate node in a data transmission link, and is respectively connected to a target terminal and the application server. The target terminal refers to a terminal where the application client and the acceleration client are located. In one embodiment, the acceleration server can realize cross-regional data transmission. For example, taking game acceleration as an example, when a game player in Country A plays a game on a game server in Country B, since a connection between Country A and Country B is a cross-border connection, a network environment is extremely bad during the cross-border connection, including DNS hijacking, line congestion, operator restrictions, and the like, which may most likely lead to problems such as game disconnection, a high delay, and impossible login. Such problems seriously affect the user's game experience. However, the acceleration server can realize interconnection between networks of Country A and Country B through layout of nodes. For example, when the user is located in Country A and a game-region server of the game played by the user is Server B (that is, the server is deployed in Country B), accelerated data transmission may be performed through an acceleration server deployed in an acceleration node corresponding to a region in Country A to a city in Country B. In one embodiment, the acceleration server may be a cloud server.

The acceleration server, after receiving the updated data packet, may resolve the updated data packet, extract the original access address located in the header of the data segment in the updated data packet, then reconstruct a network layer data packet based on the data segment by taking the original access address as an access address, and transmit the reconstructed network layer data packet to the application server indicated by the original access address. The header of the data segment newly added to the updated data packet is a unique field that can be identified by the acceleration server. The data segment content added to the header of the data segment can be quickly identified and extracted by the acceleration server. During the processing of the acceleration server, the data segment content can be forwarded only through completion of resolution of the network layer and the transport layer, without encryption and decryption. Through transmission of to-be-forwarded data segment content and the access address to the acceleration server through the updated data packet, the acceleration server simply forwards data content through address update, which greatly improves use efficiency of the acceleration server.

After the acceleration server forwards the data packet to the application server, since the application server is a host corresponding to the original access address, that is, an access destination where data transmission arrives this time, the application server may respond to the data segment content in the data packet forwarded by the acceleration server, determine response data content, and feedback the data content to the acceleration server in the form of a data packet. A source address in the data packet received by the acceleration server is the address of the acceleration server, so the response data packet fed back may be directly transmitted to the acceleration server to realize interaction between the acceleration server and the application server. The acceleration server, after acquiring the response data packet, backhauls, to the application client, the response data packet fed back by the application server. In one embodiment, based on a network connection relationship, the acceleration server may first transmit the response data packet back to the acceleration client, which is then transmitted by the acceleration client to the application client, thereby realizing a complete data interaction process.

According to the above accelerated data transmission method, based on the routing table configured for the application to be accelerated by the acceleration client, the data packet transmitted by the application client of the application to be accelerated is routed to the virtual network device, which realizes interception of the data packet, facilitates the acceleration client to read the network layer data packet from the virtual network device, resolves the original access address and the data segment in the network layer data packet, and realizes convenient and fast acquisition of the original access address. The address of the acceleration server associated with the application client is taken as the updated access address of the network layer data packet, and the original access address is added to the header of the data segment to obtain the updated data packet, which realizes transmission of the updated data packet to the acceleration server, to cause the acceleration server to access, based on the original access address in the data header, the application server indicated by the original access address and cause the acceleration server to backhaul, to the application client, the response data packet fed back by the application server. In the entire solution, a processing process of address data is implemented by the acceleration client. The acceleration client reads the network layer data packet through the routing table and the virtual network device and can directly acquire the original access address from the network layer data packet, which effectively improves an acquisition speed of the original access address and facilitates processing of the address data. The acceleration server only needs to forward the data packet according to the original access address, which significantly simplifies processing capacity of the acceleration server and can effectively improve an effect of accelerated data transmission.

In an embodiment, the accelerated data transmission method further includes: identifying the network layer data packet to determine a category of a transport layer protocol.

The network layer transmits a data packet transmitted by a source node to an access destination node according to a network address, while the transport layer is responsible for reliably transmitting data to a corresponding port. Transport layer protocols are classified into two categories. One category is a connection-oriented transport protocol (TCP), and the other category is a UDP. The TCP is characterized by first establishing a connection prior to data transmission, and releasing the connection after completion of the data transmission. Each transmission connection can only have two endpoints, and only point-to-point connections can be made. The UDP is a connectionless protocol. A source and a destination do not establish a connection prior to data transmission. When data transmission is required, data from an application program is captured and directly transmitted over a network.

Further, the accelerated data transmission method may also include: determining, based on the category of the transport layer protocol and the original access address, whether the network layer data packet is a data packet to be accelerated.

In one embodiment, the transport layer data packet may be obtained by identifying the network layer data packet, and the category of the transport layer protocol may be determined based on a type of a data header in the transport layer data packet. In one embodiment, when the transport layer data packet is a TCP data packet, the corresponding data header is a TCP header, and when the transport layer data packet is a UDP data packet, the corresponding data header is a UDP header.

The data packet to be accelerated is a data packet that needs to be accelerated by the acceleration server to be transmitted to the application server. It is determined, based on the category of the transport layer protocol and the original access address, whether the network layer data packet is a data packet to be accelerated. In one embodiment, when the category of the transport layer protocol is a UDP, it is determined, based on decision logic corresponding to the UDP and the original access address, whether the network layer data packet is a data packet to be accelerated. When the category of the transport layer protocol is a TCP, it is determined, based on decision logic corresponding to the TCP and the original access address, whether the network layer data packet is a data packet to be accelerated. The decision logic corresponding to the UDP may include judgment of a category of an interaction object of the network layer data packet and judgment of the original access address, and the decision logic corresponding to the TCP includes judgment of the original access address.

Further, the taking an address of an acceleration server associated with the application client as an updated access address of the network layer data packet, and adding the original access address to a header of the data segment to obtain an updated data packet includes:

taking the address of the acceleration server associated with the application client as the updated access address of the network layer data packet, and adding the original access address to the header of the data segment to obtain the updated data packet in response to determining the network layer data packet as a data packet to be accelerated based on the category of the transport layer protocol and the original access address.

In one embodiment, when the application client determines that the network layer data packet is a data packet to be accelerated, the application client takes the address of the acceleration server associated with the application client as the updated access address of the network layer data packet, and adds the original access address to the header of the data segment to obtain the updated data packet. Data packet update is only performed on the data packet to be accelerated by taking the network layer data packet being the data packet to be accelerated as a condition of data packet update, which can realize differential processing for the data packet and improve efficiency of accelerated data transmission of the data packet.

Further, when the network layer data packet is a non-accelerated data packet, the data packet is directly transmitted according to an access address in the non-accelerated data packet. In one embodiment, when the network layer data packet is a non-accelerated data packet, it may also be determined, based on an IP address blacklist matching the application client, whether the access IP address in the non-accelerated data packet is a black IP address. If yes, a transmission process of the data packet is terminated. If not, the data packet is transmitted according to an access address in the data packet. The IP address blacklist may be an IP address list formed by IP addresses corresponding to rejected interaction objects configured by the application client based on backend data processing logic thereof. The non-accelerated data packet is further determined and processed through the IP address blacklist, which can prevent illegal interaction and improve security during the interaction.

In this embodiment, it is determined at the application client whether the network layer data packet is a data packet to be accelerated and a precondition for data packet update is limited to the network layer data packet being a data packet to be accelerated, which can realize differential processing on the data packet and improve efficiency of accelerated data transmission of the data packet. Data packet update is not performed for the non-accelerated data packet, and the data packet is directly transmitted according to the access address of the non-accelerated data packet, to reduce occupation of acceleration resources and realize targeted accelerated data transmission.

In an embodiment, a process of determining the data packet to be accelerated includes: matching an access IP address in the original access address with an IP address whitelist when the category of the transport layer protocol is a UDP and it is determined that the network layer data packet is not a domain name resolution request packet; and determining that the network layer data packet is a data packet to be accelerated when an IP address successfully matching exists in the IP address whitelist.

In one embodiment, it is determined whether the network layer data packet is a domain name resolution request packet when the category of the transport layer protocol is a UDP. The access IP address in the original access address is matched with the IP address whitelist if the network layer data packet is not a domain name resolution request packet. It is determined, based on a matching result, whether the network layer data packet is a data packet to be accelerated.

The UDP refers to a user datagram protocol, is a connectionless transport layer protocol, and provides a simple and unreliable transaction-oriented information transfer service. The domain name resolution request packet refers to a data packet, whose access address points to a domain name server, needing to be transmitted to the domain name server which performs domain name resolution and returns an IP address obtained by resolution. The IP address whitelist refers to a data table including a plurality of required IP addresses. An IP address in the IP address whitelist indicates that a data packet including the IP address needs accelerated data transmission. The matching result includes the same IP address existing in the IP address whitelist or no same IP address existing in the IP address whitelist.

In one embodiment, when the category of the transport layer protocol is a UDP, according to interaction objects corresponding to network layer data packets, there are at least two categories corresponding to the network layer data packets. One category is a data packet that needs to interact with the application server, and the other category is a data packet that needs domain name resolution. The data packet that needs domain name resolution does not need to interact with the application server. Instead, the data packet needs domain name resolution to obtain an IP address corresponding to a domain name, so that the application client can interact with the application client corresponding to the IP address according to the IP address. For the data packet that needs to interact with the application server, the access IP address in the original access address is matched with the IP address whitelist according to the IP address in the original access address. It is determined that the network layer data packet is a data packet to be accelerated when the matching result is the same IP address existing in the IP address whitelist. It is determined that the network layer data packet is a non-accelerated data packet when the matching result is no same IP address existing in the IP address whitelist.

In this embodiment, when the category of the transport layer protocol is a UDP, it can be accurately determined, based on a category of an interaction object corresponding to the network layer data packet in combination with the IP address whitelist, whether the network layer data packet is a data packet to be accelerated, thereby realizing targeted accelerated data transmission.

In an embodiment, a process of determining whether the network layer data packet is a domain name resolution request packet when the category of the transport layer protocol is a UDP includes: performing, when the category of the transport layer protocol is a UDP, port resolution on a UDP data packet obtained by resolution to determine an access port in the UDP data packet; and determining, according to a relationship between the access port and a target port corresponding to a domain name resolution service, whether the network layer data packet is a domain name resolution request packet.

When the category of the transport layer protocol is a UDP, it indicates that the transport layer data packet obtained after the network layer data packet is resolved is a UDP data packet. The port resolution refers to a process of identifying the transport layer data packet to acquire port information from a data header of the transport layer data packet. A port in the data header of the transport layer data packet includes a source port and an access port. The source port refers to a transmission port corresponding to transmission of the data packet, and the access port refers to a receiving port corresponding to receiving of the data packet.

In one embodiment, when the application client determines that the category of the transport layer protocol is a UDP, that is, the transport layer data packet obtained after the network layer data packet is resolved is a UDP data packet, the application client performs port resolution on the UDP data packet obtained by resolution to determine the access port in the UDP data packet. The access port is compared with the target port corresponding to the domain name resolution service, it is determined that the network layer data packet is a domain name resolution request packet if the access port is the same as the target port corresponding to the domain name resolution service. And it is determined that the network layer data packet is not a domain name resolution request packet if the access port is different from the target port corresponding to the domain name resolution service.

In one embodiment, a port number of the target port corresponding to the domain name resolution service is fixed, and the port number is 0053. It is determined that the network layer data packet is a domain name resolution request packet if a port number of the access port is 0053. It is determined that the network layer data packet is not a domain name resolution request packet if the port number of the access port is not 0053.

In this embodiment, the application client performs port identification on the UDP data packet, and based on the relationship with the target port corresponding to the domain name resolution service, a data header of the UDP data packet includes an access port. Therefore, a process of port resolution is simple, identification is fast, and it can be quickly and accurately determined whether the network layer data packet is a domain name resolution request packet, thereby improving efficiency of data processing.

In an embodiment, the accelerated data transmission method further includes: acquiring a domain name to be resolved from the data segment when the network layer data packet is a domain name resolution request packet; performing domain name resolution on the domain name to obtain an IP address corresponding to the domain name; and adding the IP address to the IP address whitelist when the domain name meets a domain name acceleration condition.

The data segment refers to data content of the transport layer data packet obtained after the network layer data packet is resolved. Data content of the data segment in the domain name resolution request packet includes the domain name to be resolved. The domain name is formed by a string of dot-separated names and used for identifying positioning of a computer during data transmission, which generally includes a name of an organization and always includes a two- to three-letter suffix to indicate a type of the organization or a country or region in which the domain is located. The domain name resolution is a process of converting an intuitive domain name into an IP address that can be directly read by a computer. The domain name and the IP address are mapped to each other, making it easier for users to access the Internet without having to remember an IP address string that can be directly read by a machine. The domain name acceleration condition is a condition that is determined based on a requirement of the application to be accelerated for accelerated data transmission and limits the domain name. In one embodiment, the domain name acceleration condition may directly specify whether an IP corresponding to a specific domain name needs to be accelerated.

In one embodiment, If the application client determines that the network layer data packet is a domain name resolution request packet, the application client acquires the domain name to be resolved from the data segment and determines whether the domain name meets the domain name acceleration condition. The application client adds, based on the IP address corresponding to the domain name obtained by domain name resolution on the domain name, the IP address to the IP address whitelist when the domain name meets the domain name acceleration condition.

In one embodiment, the application client pulls a domain name rule from a backend. The domain name rule is a rule corresponding to the application to be accelerated. The domain name rule includes two types of domain names. The first type is that an IP corresponding to a domain name needs to be accelerated. The second type is that an IP corresponding to a domain name does not need to be accelerated. The domain name meets the domain name acceleration condition when the domain name to be resolved is the first-type domain name. The domain name does not meet the domain name acceleration condition when the domain name to be resolved is the second-type domain name. The application client uses a mapping relationship between domain names and IP addresses in a DNS to acquire the IP address corresponding to the domain name from the DNS and add the IP address to the IP address whitelist.

In this embodiment, the IP address obtained by domain name resolution is added to the IP address whitelist when the domain name meets the domain name acceleration condition, which can realize expansion of the IP address whitelist and facilitate more accurate data transmission acceleration during subsequent processing. Moreover, there may be a plurality of IP addresses obtained based on domain name resolution. Compared with directly updating the IP address whitelist based on IP addresses, in a manner of directly limiting the domain name by limiting the domain name acceleration condition, the plurality of IP addresses obtained based on domain name resolution can be quickly added.

In an embodiment, the performing domain name resolution on the domain name to obtain an IP address corresponding to the domain name includes: updating an access address in the domain name resolution request packet to an address corresponding to a preset domain name server, and transmitting the domain name resolution request packet with the updated access address to the domain name server; and receiving the IP address returned after the domain name server resolves the domain name in the domain name resolution request packet.

The domain name server is a server that provides a conversion service between IP addresses and domain names. There are a variety of domain name servers. The access address in the domain name resolution request packet may be an address of any one of the domain name servers. Different domain name servers have different resolution accuracy for a domain name. The preset domain name server is a domain name server whose domain name resolution accuracy meets a resolution accuracy condition. The preset domain name server may be pre-configured based on the domain name resolution accuracy of the domain name server.

In one embodiment, the application client updates the access address in the domain name resolution request packet to the address corresponding to the preset domain name server, and transmits the domain name resolution request packet with the updated access address to the domain name server. The domain name server resolves the domain name in the domain name resolution request packet to obtain the IP address corresponding to the domain name, and the domain name server returns the IP address to the application client.

In one embodiment, the application client updates an access IP address in the domain name resolution request packet to an IP address corresponding to the preset domain name server, and transmits the domain name resolution request packet with the updated access IP address to the virtual network device. The virtual network device transmits the domain name resolution request packet with the updated access IP address to the domain name server. The domain name server resolves the domain name in the domain name resolution request packet to obtain the IP address corresponding to the domain name, and then returns the IP address to the virtual network device. The application client reads, from the virtual network device, the IP address returned by the domain name server.

In this embodiment, the access address in the domain name resolution request packet is updated to the address corresponding to the preset domain name server, and a specified domain name server resolves the domain name in the domain name resolution request packet, which can ensure accuracy of the IP address obtained by resolution.

In an embodiment, the determining, based on the category of the transport layer protocol and the original access address, whether the network layer data packet is a data packet to be accelerated includes:

matching an original access IP address in the original access address with an IP address whitelist when the category of the transport layer protocol is a TCP; and determining, according to a matching result, whether the network layer data packet is a data packet to be accelerated.

In one embodiment, a process of determining whether the network layer data packet is a data packet to be accelerated includes: determining that the network layer data packet is a data packet to be accelerated when an IP address successfully matching exists in the IP address whitelist; and determining that the network layer data packet is a non-accelerated data packet when no IP address successfully matching exists in the IP address whitelist.

The TCP is a connection-oriented, reliable, byte-stream-based transport-layer communication protocol. The category of the transport layer protocol being a TCP means that the transport layer data packet is a TCP data packet. The original access IP address refers to an original access IP acquired through an IP header after resolution of the network layer data packet, that is, an IP address of the application server serving as an interaction object.

In one embodiment, when the application client determines that the category of the transport layer protocol is a TCP, a processing process thereof is the same as that of an ordinary UDP data packet. The application client matches the original access IP address with the IP address whitelist, and determines, according to a matching result, whether the network layer data packet is a data packet to be accelerated. It is determined that the network layer data packet is a data packet to be accelerated when the matching result is a same IP address existing in the IP address whitelist. It is determined that the network layer data packet is a non-accelerated data packet when the matching result is no same IP address existing in the IP address whitelist.

In this embodiment, when the transport layer protocol is a TCP, it can be quickly and accurately determined, based on the IP address whitelist, whether the network layer data packet is a data packet to be accelerated, thereby realizing targeted accelerated data transmission.

In an embodiment, the taking an address of an acceleration server associated with the application client as an updated access address of the network layer data packet, and adding the original access address to a header of the data segment to obtain an updated data packet includes: forwarding the network layer data packet to a local server created by an acceleration client in response to identifying the network layer data packet and determining that the category of the transport layer protocol is a TCP; and taking, based on the local server, the address of the acceleration server associated with the application client as the updated access address of the network layer data packet, and adding the original access address to the header of the data segment to obtain the updated data packet.

The local server is a server locally created by the acceleration client (that is, a terminal where the acceleration client is located) and configured for data processing. The local server is caused to handle handshake, wave, traffic control, and other functions of the TCP through a system protocol stack.

Further, transmitting the updated data packet to the acceleration server includes transmitting the updated data packet to the acceleration server based on the local server.

In one embodiment, when the application server determines, based on the resolution for the network layer data packet, that the category of the transport layer protocol is a TCP, the application server creates a local server in the operating system of the terminal and forwards the network layer data packet to the local server. The local server takes the address of the acceleration server associated with the application client as the updated access address of the network layer data packet, and adds the original access address to the header of the data segment to obtain the updated data packet. The local server transmits the updated data packet to the acceleration server.

In one embodiment, for a process of processing the TCP data packet, the acceleration client needs to record four addresses: an address of the application client, an address of the local server, an address of the acceleration server, and an address of the application server. There is no need to record the address of the acceleration server for a data packet that does not need to be accelerated. The acceleration client transmits the data packet to the local server according to the address of the local server. The local server, after receiving the data packet, transmits the data packet to the acceleration server or the application server. The local server, after receiving a reply packet from the acceleration server or the application server, may query an address relationship recorded at the time of transmission and backhaul data of the reply packet to the application client. Since the TCP is a data-stream-oriented transport protocol, during accelerated data transmission, a data stream can be transmitted only if a connection channel from a source address to an access address is established through the local server when the access address and the source address do not change. There is a need to re-establish a connection channel through the local server when the access address or the source address changes.

In this embodiment, the update of the network layer data packet and the transmission of the data packet are realized through the local server, which can adapt to transmission characteristics of the TCP, and realize accelerated transmission of the network layer data packet constructed with the TCP without responding to an original system architecture.

In an embodiment, the accelerated data transmission method further includes adding the address of the acceleration server associated with the application client and the original access address to a TCP data list.

The TCP data list is used for recording related information of the TCP data packet, which may specifically include the address of the application client, the address of the local server, the address of the acceleration server, and the address of the application server. Through the TCP data list, a data query basis is provided for the local server to update the address.

In one embodiment, the application server creates the TCP data list and records the address of the created local server and the address of the acceleration server in the TCP data list. The network layer data packet is resolved to obtain a source address and an access address, that is, the address of the application client and the address of the application server, and the address of the application client and the address of the application server are added to the TCP data list.

Further, the taking, based on the local server, the address of the acceleration server associated with the application client as the updated access address of the network layer data packet, and adding the original access address to the header of the data segment to obtain the updated data packet includes: reversely querying the TCP data list based on the local server to obtain the address of the acceleration server and the original access address; and taking, based on the local server, the address of the acceleration server as the updated access address of the network layer data packet, and adding the original access address to the header of the data segment to obtain the updated data packet.

In one embodiment, after the local server receives the network layer data packet corresponds to the TCP, the local server reversely queries the TCP data list to obtain the address of the acceleration server and the original access address, the local server takes the address of the acceleration server as the updated access address of the network layer data packet and adds the original access address to the header of the data segment to obtain the updated data packet, and the local server transmits the updated data packet to the acceleration server.

In this embodiment, the application client adds the address of the acceleration server and the address of the application server to the TCP data list, so that the local server can reversely query the TCP data list, to quickly and easily obtain the address of the acceleration server and the address of the application server, which increases a processing speed of data packet update.

In an embodiment, the backhauling, to the application client, a response data packet fed back by the application server includes:

receiving, by the acceleration client, a response data packet backhauled by the acceleration server, the response data packet being fed back to the acceleration server by the application server; and updating, by the acceleration client, a source address of the response data packet to an address of the application server, and feeding back the response data packet with the updated source address to the application client through the virtual network device.

The virtual network device refers to a virtual network device created in a kernel of an operating system. The virtual network device is configured to assist the acceleration client to transmit and receive data packets with the application client. The virtual network device can receive a data packet transmitted by the application client and transmit the response data packet with the address updated by the acceleration client to the application client.

Based on a transmission link of accelerated data transmission, the acceleration server performs data transmission with the acceleration client and data interaction with the application client through the virtual network device. In order to realize fast and convenient transmission of the response data packet, the acceleration server first backhauls, to the acceleration client, the response data packet fed back by the application server, updates the source address of the response data packet to the address of the application server, and updates the access address to the address of the application client to obtain an updated response data packet. The acceleration client feeds back the updated response data packet to the application client through the virtual network device.

In this embodiment, through the virtual network device and the acceleration client, a path for backhaul of the response data packet to the application client is clarified, and rapid transmission of the response data packet can be realized. Through the update of the source address and the access address, information represented by the response data packet acquired by the application client is backhauled to the application client by the application server. For the application client, content of the data packet transmitted and received may not be affected by the accelerated data transmission process, ensuring data accuracy during the accelerated data transmission process.

In an embodiment, the application to be accelerated is a game to be accelerated. The accelerated data transmission method further includes: determining, in response to a selection operation for a game to be accelerated in a candidate game list, a geographical region where a game server of the game to be accelerated is located; determining, based on respective speed measurement results of candidate server nodes matching the geographical region, a target node in the candidate server nodes that meets a speed measurement condition; and determining an acceleration server deployed on the target node as the acceleration server associated with the application client.

The candidate game list includes game identifiers of one or more games capable of accelerated data transmission. The game identifiers may be formed by at least one piece of data information in game icons and game names. Each game identifier represents a specific game. When the user selects a game identifier from the candidate game list, the game identifier is the selected game to be accelerated. The geographical region where the game server is located is also called a game-region server. For example, if the geographical region where the game server is located is Japan, the game-region server may be referred to as a Japanese server for short. If the geographical region where the game server is located is South Korea, the game-region server may be referred to as a Korean server for short. The candidate server nodes are server nodes that can be selected, and server nodes correspond to cross-regional transmission paths, such as China-Korea and China-Japan. In one embodiment, for example, game users are located in China. Acceleration nodes are configured in a distributed manner in China. Configuration regions mainly include three major regions, namely East China (eastern regions of China), North China (regions north of the Qinling Mountains-Huaihe River line and south of the Great Wall in China), and South China (southern regions in China). For a game whose game-region server is a Japanese server, the candidate server nodes include three main categories, namely East China-Tokyo, South China-Tokyo, and North China-Tokyo. The target node that meets the speed measurement condition may be the candidate server node with an optimal speed measurement result. The speed measurement results refer to sampling a number of server nodes in the regions for speed measurement, and then the target node with an optimal speed measurement result is selected according to load, delay, and other data of nodes. A server is deployed on a server node. In one embodiment, the server node may be a cloud server access point.

In one embodiment, the candidate game list is displayed on a display page of the acceleration client. The acceleration client displays, in response to a selection operation for a game to be accelerated in the candidate game list, candidate region servers of the game to be accelerated, displays, in response to a selection operation for a target region server in the candidate region servers, candidate nodes corresponding to the target region server and a speed measurement result corresponding to each of the candidate nodes, initiates, in response to a user's selection operation of a target node in the candidate nodes based on the speed measurement result, an acceleration request for the game to be accelerated, and determines an acceleration server deployed on the target node as the acceleration server associated with the application client.

In this embodiment, taking a game scene as an example, it is easy for the user to select the game to be accelerated based on the candidate game list. Based on the geographical region where the game server of the game to be accelerated is located, the candidate server nodes matching the geographical region are determined, which can realize transmission of a game data packet across geographical regions. Based on the respective speed measurement results of the candidate server nodes matching the geographical region, the target node in the candidate server nodes that meets the speed measurement condition is determined, and an optimal target node is selected, so that game data can be transmitted based on the acceleration server deployed on the target node to improve an effect of accelerated data transmission of the game data.

This application further provides an application scene of game acceleration in which a game player and a game server are located in different countries on a macOS platform. macOS is a graphical-user-interface based operating system. The system is an operating system conforming to a portable operating system interface (POSIX) standard and provides UnIPlexed Information and Computing Service (Unix, a multi-user, multi-process computer operating system) command lines and powerful application tools thereof. The above accelerated data transmission method is applied to the application scene. In one embodiment, the application of the accelerated data transmission method to the application scene is as follows:

When a game player in Country A plays a game on a game server in Country B (called a foreign server game for short), since a network environment for a connection between Country A and Country B is a cross-border connection is extremely bad, including DNS hijacking, line congestion, operator restrictions, and the like which may most likely to cause the user to have problems such as game disconnection, a high delay, and impossible login. Such problems seriously affect the user's game experience. As a result, it is very difficult to play foreign server games on macOS, and the game experience is poor. In the solution, in the environment of Country A, a TUN device is created on the macOS platform, and a data packet generated by the user through a game client is routed to the TUN device by modifying a routing table. Then, the data packet on the TUN device is forwarded to the cloud server access point by accelerating an application side, and the data packet is connected to the game server in Country B through a dedicated line of a cloud server, which prevents problems such as network congestion and operator hijacking, and realizes low-delay and low-jitter games played on foreign servers in the environment of Country A, thereby improving the user's game experience.

In one embodiment, as shown in FIG. 6, the application of the accelerated data transmission method to the game application scene includes the following steps:

Step 602: Determine, in response to a selection operation for a game to be accelerated in a candidate game list, a geographical region where a game server of the game to be accelerated is located.

Step 604: Determine, based on respective speed measurement results of candidate server nodes matching the geographical region, a target node in candidate server nodes that meets a speed measurement condition, and determine an acceleration server deployed on the target node as an acceleration server corresponding to a game client.

Step 606: Route, based on a routing table configured for the game to be accelerated, a data packet transmitted by a game client of the game to be accelerated to a virtual network device.

Step 608: Read a network layer data packet from the virtual network device, resolve the network layer data packet to obtain an original access IP address and a transport layer data packet, determine a category of a transport layer protocol, and resolve the transport layer data packet to obtain an original access port and a data segment.

Step 610: Perform port resolution on a UDP data packet obtained by resolution to determine an access port in the UDP data packet when the category of the transport layer protocol is a UDP.

Step 612: Determine, when the access port is the same as a target port corresponding to a domain name resolution service, that the network layer data packet is a domain name resolution request packet, and acquire a domain name to be resolved from the data segment.

Step 614: Update an access address in the domain name resolution request packet to an address corresponding to a preset domain name server, transmit the domain name resolution request packet with the updated access address to the domain name server, and receive an IP address returned after the domain name server resolves a domain name in the domain name resolution request packet.

Step 616: Add the IP address to an IP address whitelist when the domain name meets a domain name acceleration condition.

Step 618: Determine that the network layer data packet is a data packet to be accelerated when the access port is different from the target port corresponding to the domain name resolution service and the IP address whitelist includes an access IP address in an original access address.

Step 620: Take an address of an acceleration server corresponding to the game client as an updated access address of the network layer data packet, add the original access address to a header of the data segment to obtain an updated data packet, and transmit the updated data packet to the acceleration server.

Step 622: Match an original access IP address in the original access address with the IP address whitelist when the category of the transport layer protocol is a TCP.

Step 624: Determine that the network layer data packet is a data packet to be accelerated when the IP address whitelist includes the access IP address in the original access address.

Step 626: Add the address of the acceleration server corresponding to the game client and the original access address to a TCP data list, and forward the network layer data packet to a local server created by an acceleration client.

Step 628: The local server reversely queries the TCP data list to obtain the address of the acceleration server and the original access address, takes the address of the acceleration server as the updated access address of the network layer data packet, adds the original access address to the header of the data segment to obtain the updated data packet, and transmits the updated data packet to the acceleration server.

Step 630: The acceleration server accesses, based on an original access address in a data header, the game server indicated by the original access address, and the acceleration server is caused to backhaul, to the acceleration client, a response data packet fed back by the game server.

Step 632: The acceleration client updates a source address of the response data packet to an address of the game server, and feeds back the response data packet with the updated source address to the game client through the virtual network device.

Figure 7:
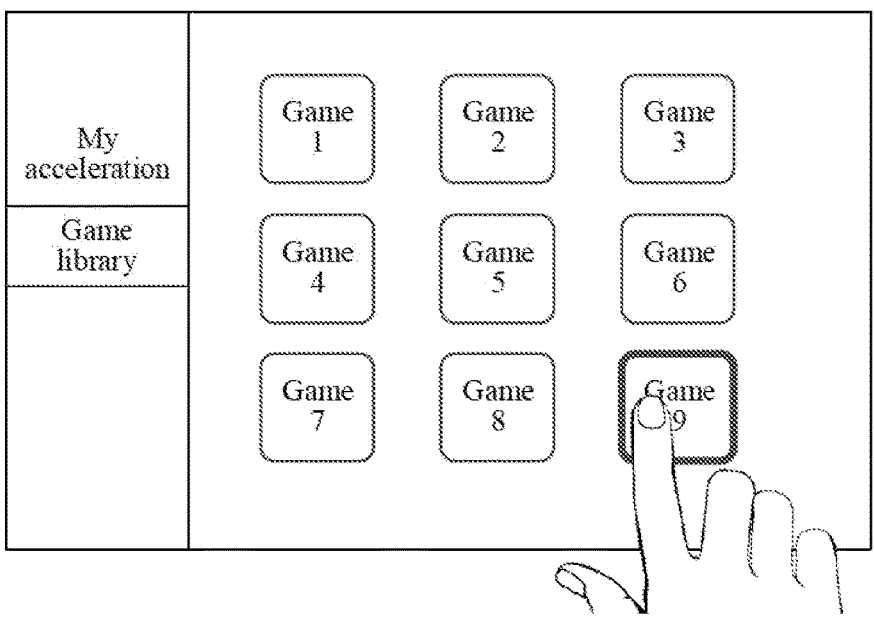
FIG. 7 is a schematic diagram of a selection page for a game to be accelerated according to an embodiment.

In one embodiment, a game library including game identifiers of games that can be accelerated is displayed on a page of the acceleration client, such as Game 1 to Game 9 shown in FIG. 7. The user selects a game that needs to be accelerated in the game library provided by the acceleration client, and the user can quickly find the game that needs to be accelerated through keyword search, and display the game on a current page. After the user selects the game that needs to be accelerated, the acceleration client may display candidate region servers (geographical regions where game servers are located) and candidate acceleration nodes corresponding to the game to be accelerated, and the user directly triggers network acceleration on the game by sequentially selecting the region servers and the acceleration nodes. In another specific application, alternatively, the user, after selecting the game that needs to be accelerated and a region server, clicks a "smart acceleration" control, and the acceleration server automatically assigns an optimal acceleration node to perform network acceleration on the game.

Figure 8:
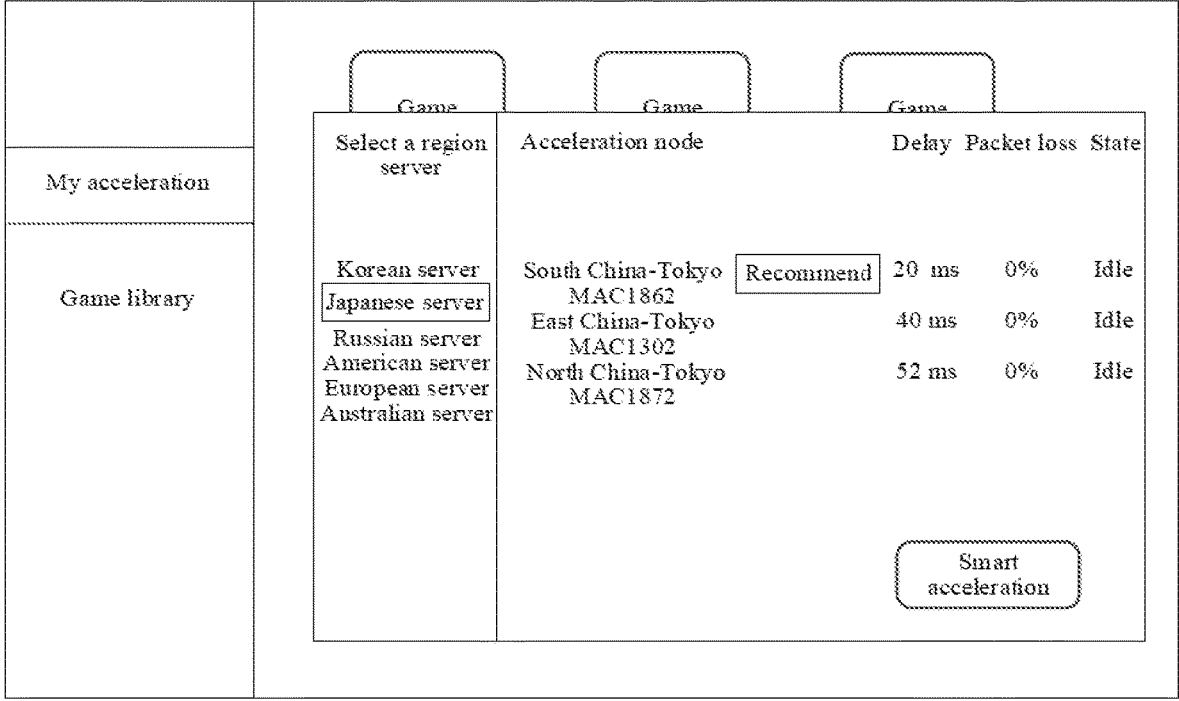
FIG. 8 is a schematic diagram of a page for selecting a region server and a node of a game to be accelerated according to an embodiment.

After the user clicks "game acceleration", the acceleration client may acquire key information such as a game that needs to be accelerated, a region server of the game, and an acceleration node. In practical applications, the user may manually select the acceleration node, or request automatic selection of the acceleration node. The acceleration node is configured to enable a direct connection between two geographical regions. The user's selection of the region server is a node for a destination geographical region. The candidate acceleration nodes include a plurality of acceleration nodes whose starting geographical regions are different but whose destination geographical regions are the selected region server. In one embodiment, as shown in FIG. 8, the starting geographical regions are configured in a distributed manner in China, including the three major regions, namely East China, North China, and South China according to China's geographical division. The acceleration client acquires available candidate acceleration nodes from the backend according to the selected game and game-region server information, samples transmitted data of a number of acceleration nodes from each region for speed measurement, and displays speed measurement results in the corresponding regions of the corresponding acceleration nodes, and the measurement results include load data and delay data, so that an optimal acceleration node can be manually or automatically selected as the target node based on the displayed load data and delay data, to determine the acceleration server corresponding to the acceleration node.

In one embodiment, the acceleration client determines, in response to the selected operation for the game to be accelerated in the candidate game list, candidate geographical regions where the game server of the game to be accelerated is located. The acceleration client determines a selected target geographical region in response to the user's selection operation for the candidate geographical regions. The acceleration client displays respective speed measurement results of candidate server nodes matching the target geographical region. The acceleration client determines a target node in response to the user's selection operation for a target server node in the candidate server nodes, and determines an acceleration server deployed on the target node as the acceleration server corresponding to the game client. The acceleration client configures a routing table for the game to be accelerated, and routes, based on the routing table, the data packet transmitted by the game client of the game to be accelerated to the virtual network device for transmission acceleration.

A transmission line of a game data packet is determined by determining the acceleration server. In order to realize transmission of the data packet according to the determined transmission line, corresponding acceleration configuration is also required. In one embodiment, an operating system corresponding to a terminal where the game application and the acceleration client are located may be macOS. The macOS is an operating system that conforms to a POSIX standard and supports most Unix characteristics, and thus can support TUN. The acceleration client creates a TUN device in the operating system of the terminal and acquires a file descriptor of the TUN device. After the creation of the TUN device, a routing table of the system needs to be configured so that the game data packet transmitted by the game client can be routed to the TUN device based on the routing table. TUN can be recreated each time a new game is selected for acceleration, and the created TUN may be released after the game acceleration ends, to prevent unnecessary occupation of resources of the terminal and achieve efficient and reasonable utilization of the resources of the terminal.

In order to improve efficiency of data transmission, during the accelerated transmission of the data packet, differential processing is performed on the data packet on the TUN device through the acceleration client. In one embodiment, the acceleration client performs differential processing on the data packet transmitted by the game client based on a domain name rule pulled from the backend and an IP address blacklist/whitelist. The domain name rule is used for performing corresponding processing for a situation where the acquired data packet is a DNS data packet. The domain name rule classifies data packets into three types according to access IP addresses. The first type is that accelerated resolution is required for the DNS data packet and a data packet corresponding to an IP address obtained by resolution needs to be accelerated. A specific processing manner may be to add the IP address obtained by resolution to the IP address whitelist. The second type is that accelerated resolution is required for the DNS data packet and the data packet corresponding to the IP address obtained by resolution does not need to be accelerated. The third type is that accelerated resolution is not required for the DNS data packet and the data packet corresponding to the IP address obtained by resolution does not need to be accelerated. The accelerated resolution refers to modifying an access address of the DNS data packet to transmit the DNS data packet to a specified domain name server which resolves a domain name in the DNS data packet to obtain an IP address corresponding to the domain name. "Accelerated resolution is not required for the DNS data packet" is to transmit, based on an original access address, the DNS data packet to a domain name server corresponding to the access address and to receive an IP address after the domain name server resolves a domain name.

The IP address blacklist/whitelist is to perform corresponding processing for TCP data packets and non-DNS ordinary UDP data packets. In one embodiment, accelerated transmission is performed on a data packet if an original access IP address in the data packet belongs to the IP address whitelist. The data packet is intercepted and not transmitted if the original access IP address in the data packet belongs to the IP address blacklist. The data packet is transmitted by traffic bare-connection if the original access IP address in the data packet neither belongs to the IP address whitelist nor belongs to the IP address blacklist. The traffic bare-connection refers to direct transmission based on the original access address and in accordance with an existing data transmission manner without through the acceleration server.

Figure 9:
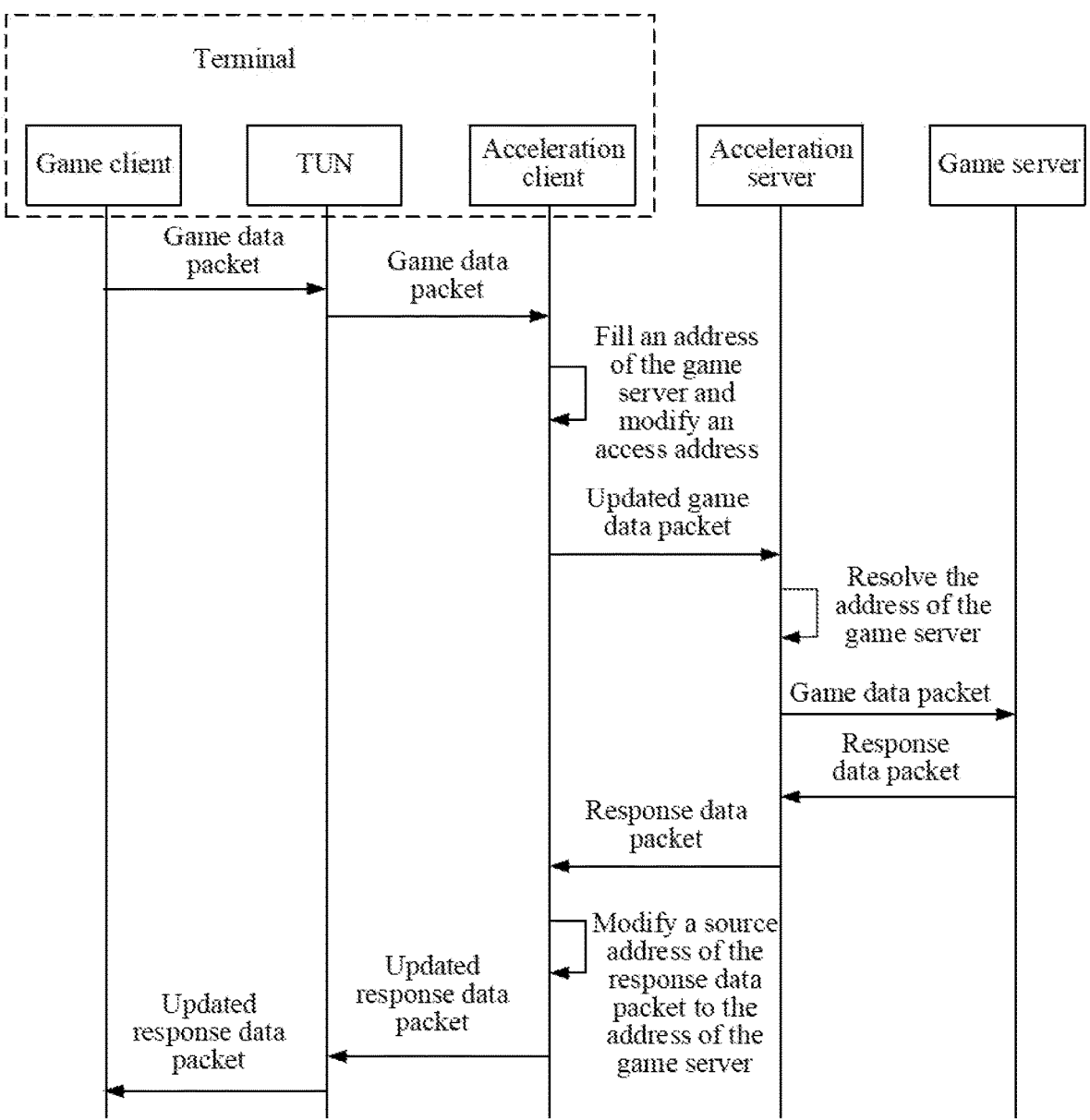
FIG. 9 is a timing diagram of an accelerated data transmission method according to an embodiment.

A timing diagram of an accelerated data transmission process is shown in FIG. 9. The terminal includes a game client, an acceleration client, and created TUN. In one embodiment, the game client routes the game data packet to the TUN through the routing table. The acceleration client reads the game data packet from TUN. The acceleration client, when determining, based on the access IP address in the game data packet, that the game data packet is a data packet to be accelerated, adds an original access IP address, i.e., an address of the game server, to a header position of the data segment, modifies an access address of the game data packet to the address of the acceleration server to obtain an updated game data packet, and transmits the updated game data packet to the acceleration server. The acceleration server resolves data of the header of the data segment to obtain the address of the game server and transmits the game data packet to the game server. The game server makes a corresponding response to the game data packet, and feeds back a response data packet to the acceleration server. The acceleration server backhauls the response data packet to the acceleration client. The acceleration client modifies a source address of the response data packet, modifies the source address from the address of the acceleration server to the address of the game server, and feeds back the response data packet to the game client through the TUN. For a game data packet to be transmitted by the game client, forwarding of the game data packet is a key point to realize accelerated transmission of game data. The data read by the acceleration client from the TUN device according to the file descriptor of the TUN device is the game data packet to be transmitted by the game client. After acquiring the game data packet, the acceleration client may record a source IP, a source port, an access IP, and an access port of an original data packet as a quadruple, and then perform different processing according to different transport layer protocols.

A data packet update manner corresponding to the data packet to be accelerated is related to a transport layer protocol corresponding thereto. If the transport layer protocol is a UDP, during each data packet transmission process, the acceleration client may add acceleration information including an access IP address and an access port of the game server to the header of the data segment in the data packet, modify an access IP address and an access port of the data packet to an IP address and a port of the acceleration server, and then transmit the modified data packet to the acceleration server to establish an accelerated transmission channel between the acceleration client and the acceleration server and realize interaction with the game server based on the acceleration server. If the transport layer protocol is a TCP, an acceleration channel is established through an authentication packet. Only during first data packet transmission process, the acceleration information is added to the header of the data segment of the data packet, the access IP address and the access port of the data packet are modified to the IP address and the port of the acceleration server, and then the modified data packet is transmitted to the acceleration server to establish the accelerated transmission channel between the acceleration client and the acceleration server. Subsequent data packets that need to be accelerated can be directly transmitted to the acceleration server based on the established accelerated transmission channel, and interaction with the game server is realized based on the acceleration server.

Figure 10:
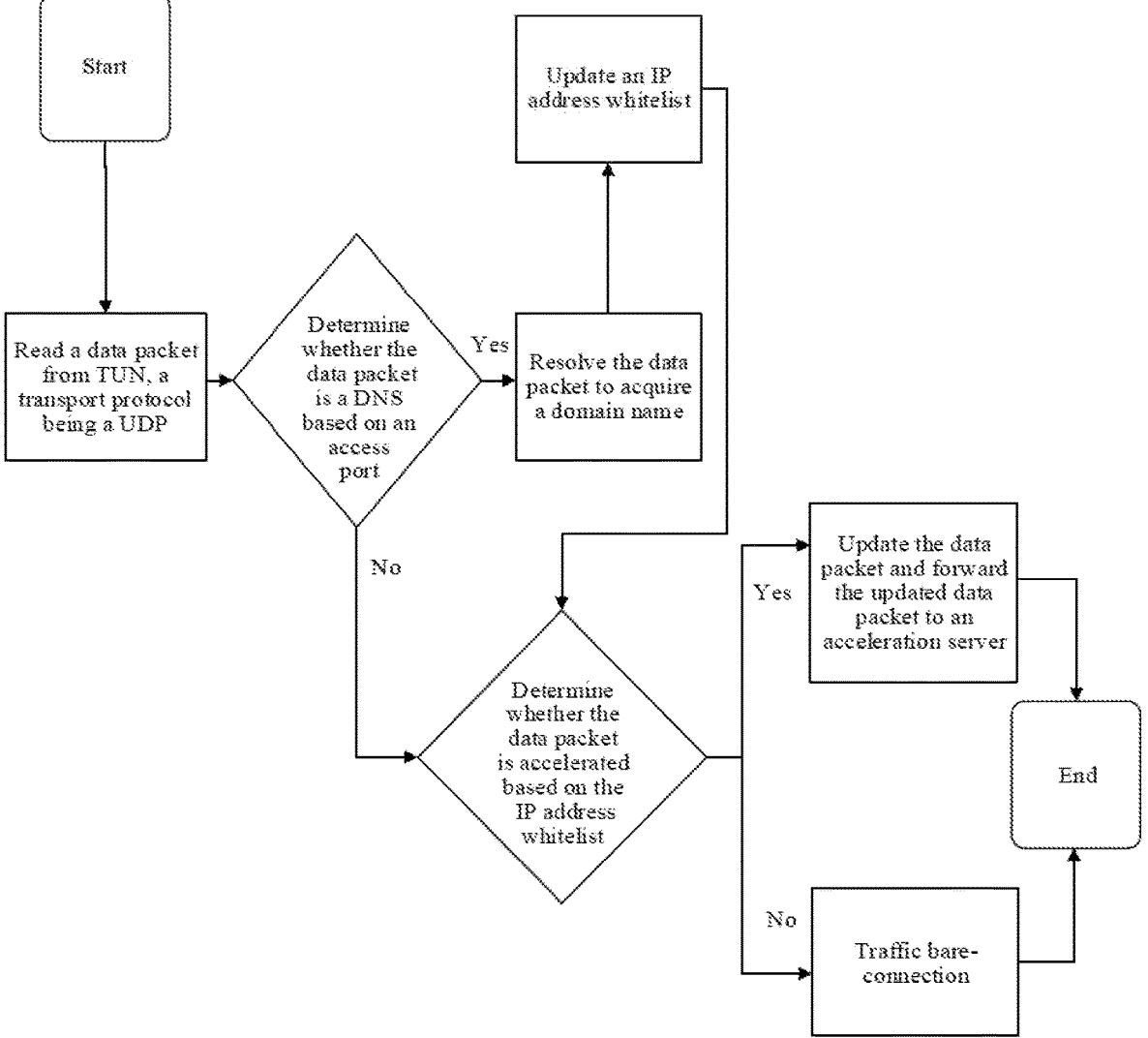
FIG. 10 is a schematic flowchart corresponding to a user datagram protocol (UDP) data packet according to an embodiment.

In one embodiment, when the transport layer protocol is a UDP, as shown in FIG. 10, the acceleration client reads a transport layer data packet from the TUN to resolve the transport layer data packet to obtain an access IP address and a UDP data packet, then identifies a port number of an access port in the UDP data packet, and determines, based on the port number, whether the data packet is a DNS data packet. If the port number is 0053, it is determined that the data packet is a DNS data packet. A domain name that needs to be resolved is acquired from a data segment of the data packet through a DNS protocol. A resolution process corresponding to the DNS data packet may be determined based on a category of the access IP address in the domain name rule. In one embodiment, in the case of the first type, that is, accelerated resolution is required and a data packet corresponding to an access IP obtained by resolution also needs to be accelerated, the acceleration client may transmit the DNS data packet to a specified domain name server. The acceleration client, after receiving a DNS reply packet returned by the specified domain name server, adds IP addresses in the reply packet to the IP address whitelist. In the case of the second type, that is, accelerated resolution is required and the data packet corresponding to the access IP obtained by resolution does not need to be accelerated, the acceleration client may transmit the DNS data packet to a specified domain name server, and after receiving a DNS reply packet returned by the specified domain name server, feeds back IP addresses in the reply packet to the game client. The game client selects one IP address as the access IP based on its own processing logic. In the case of the third type, that is, accelerated resolution is not required and the data packet corresponding to the access IP obtained by resolution does not need to be accelerated, the acceleration client may directly transmit the DNS data packet to a domain name server corresponding to an original access address, and after receiving a DNS reply packet returned by the domain name server, feeds back IP addresses in the reply packet to the game client. The game client selects, based on its own processing logic, one from the IP addresses in the reply packet as the access IP.

If the port number of the access port in the UDP data packet is not 0053, that is, the UDP data packet is an ordinary UDP packet, it is determined according to the IP address blacklist/whitelist whether accelerated data transmission is required. The original access IP address in the data packet is matched with the IP address whitelist and the IP address blacklist respectively. The data packet is determined as a data packet to be accelerated and accelerated transmission is performed on the data packet to be accelerated if the original access IP address in the data packet belongs to the IP address whitelist. The data packet is intercepted and not transmitted if the original access IP address in the data packet belongs to the IP address blacklist. For the accelerated transmission on the data packet to be accelerated, firstly, an access address of the data packet may be updated to the address of the acceleration server, the data packet is transmitted to the acceleration server, and then data interaction with the game server is performed through the acceleration server. The data packet is directly transmitted to the game server through traffic bare-connection in an original network connection manner if accelerated transmission is not required for the data packet.

Figure 11:
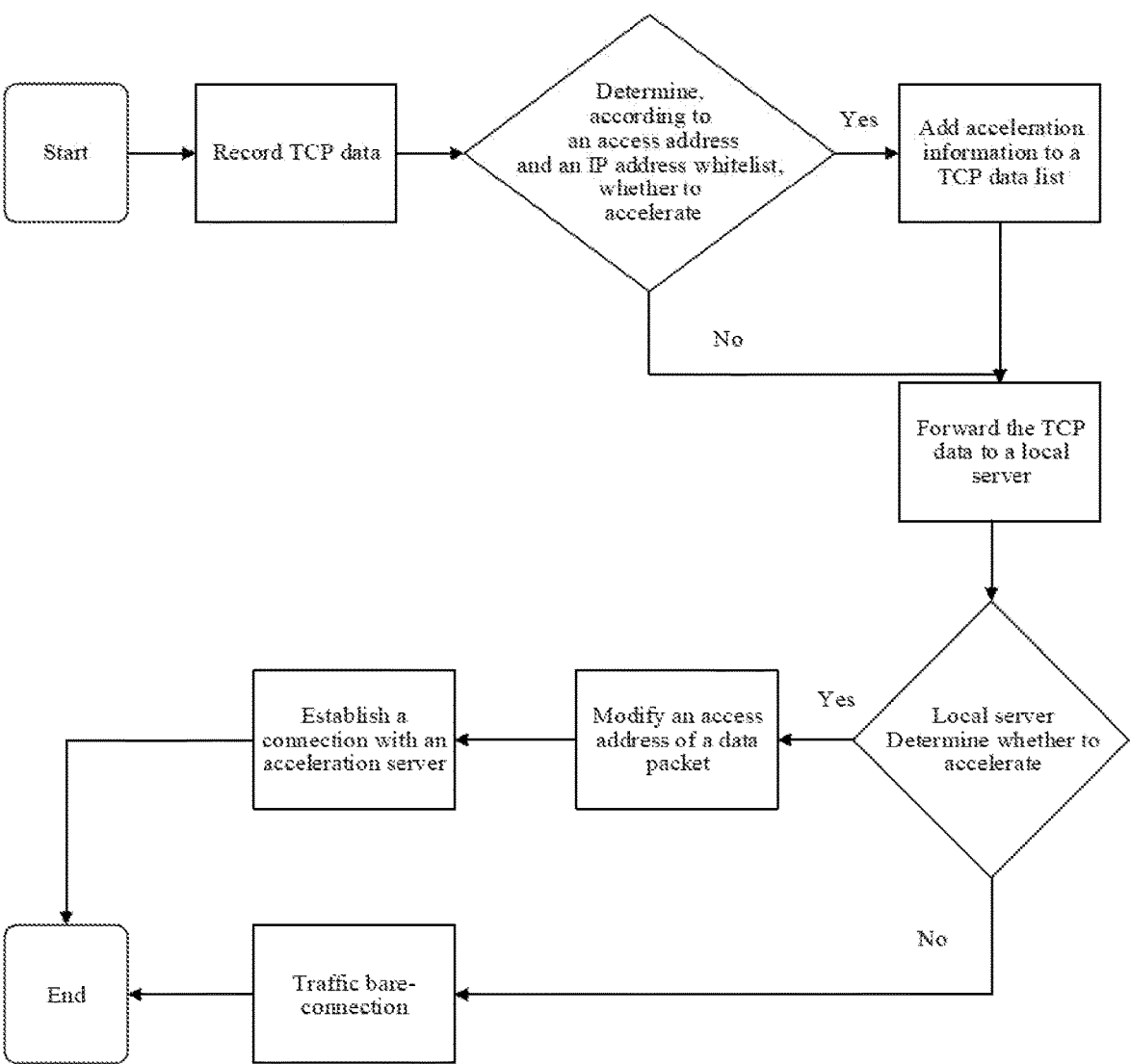
FIG. 11 is a schematic flowchart corresponding to a TCP data packet according to an embodiment.

Update of the data packet is similar to that of the ordinary UDP data packet when the transport layer protocol is a TCP. However, since the TCP is connection-oriented, for a data packet acquired from TUN, the acceleration client may locally establish a local server at a terminal, and process handshake, wave, traffic control, and other processes of the TCP through a protocol stack of the local server. In one embodiment, as shown in FIG. 11, the acceleration server adds the address of the acceleration server corresponding to the game client and the original access address to the TCP data list for TCP data recording, and forwards the game data packet to the local server created by the acceleration client. The local server, after receiving the game data packet, reversely queries the TCP data list to obtain the address of the acceleration server and the original access address, the local server takes the address of the acceleration server as an updated access address of the game data packet and adds the original access address to the header of the data segment to obtain an updated data packet, and the local server transmits the updated data packet to the acceleration server to realize interaction with the game server. The local server, after receiving a response data packet from the game server, transmits the response data packet to the acceleration server. The local server, after receiving the response data packet, may query an address relationship recorded during the transmission and transmit the response data packet back to the game client.

The acceleration server, after receiving the game data packet, determines an address of the game server based on an access IP address and an access port recorded in the header of the data segment in the game data packet. Then, the acceleration server transmits the game data packet to the game server. The response data packet from the game server may be transmitted back to the acceleration server. The acceleration server, after receiving the response data packet from the game server, may transmit the response data packet to the acceleration client. The acceleration client, after receiving the response data packet from the acceleration server, modifies a source address to the address of the game server, and then feeds back the response data packet with the updated source address to the game client to realize accelerated data interaction between the game client and the game server. During the accelerated transmission of the data packet, the acceleration client needs to record a plurality of addresses, including an address of the game client, an address of the acceleration client, an address of the acceleration server, and an address of the game server. For a TCP data packet, the recorded addresses also include an address of the local server. There is no need to record the address of the acceleration server for a data packet that does not need to be accelerated.

Through the above processing, a game data packet generated by the game client is routed to a TUN device based on a configured routing table, and the acceleration client reads the data packet from the TUN device and performs different forwarding according to different data protocols and acceleration rules. According to the TCP/UDP used by the acceleration server for communication, communication is performed with the acceleration server according to different data processing processes. The acceleration server performs forwarding according to the access address recorded in the header of the data segment of the data packet. During the entire data processing, both processing of the data address relationship and judgment of the acceleration logic are performed in the acceleration client, which reduces a data processing amount of the acceleration server, realizes a function of network acceleration for the game, performs differential processing on the game data packet without affecting normal network access of the user, forwards the data packet according to a game-region server selected by the user to achieve a goal of game acceleration, and meets acceleration requirements of macOS game users.

It is to be understood that, although each step of the flowcharts in FIG. 2 is displayed sequentially according to arrows, the steps are not necessarily performed according to an order indicated by arrows. Unless otherwise explicitly specified herein, execution of the steps is not strictly limited, and the steps may be performed in other sequences. Moreover, at least part of the steps in FIG. 2 may include a plurality of steps or a plurality of stages. These steps or stages are not necessarily executed at the same time, but can be executed at different times. The order of execution of these steps or stages is not necessarily performed sequentially, but may be performed in turn or alternately with other steps or at least a part of steps or stages of other steps.

Figure 12:
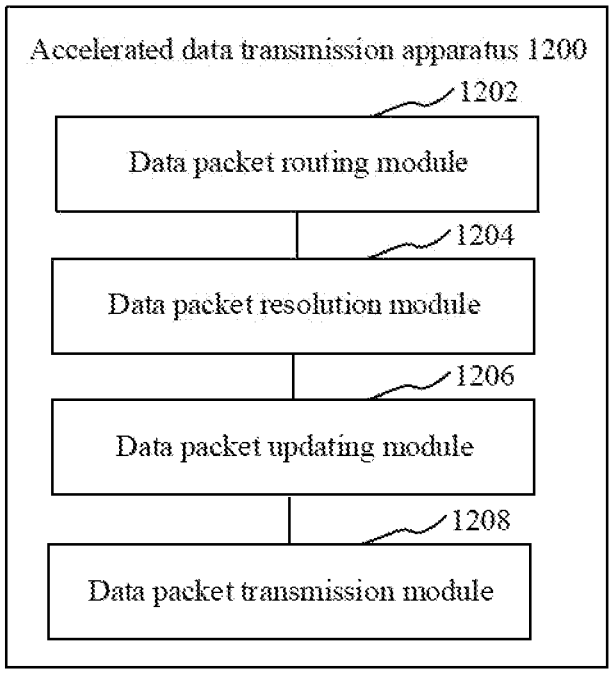
FIG. 12 is a structural block diagram of an accelerated data processing apparatus according to an embodiment.

In an embodiment, as shown in FIG. 12, an accelerated data transmission apparatus 1200 is provided. The apparatus may be a software module or a hardware module or a combination thereof and becomes a part of a computer device. The apparatus specifically includes: a data packet routing module 1202, a data packet resolution module 1204, a data packet updating module 1206, and a data packet transmission module 1208.

The data packet routing module 1202 is configured to route, based on a routing table configured for an application to be accelerated, a data packet transmitted by an application client of the application to be accelerated to a virtual network device.

The data packet resolution module 1204 is configured to read a network layer data packet from the virtual network device, and resolve an original access address and a data segment in the network layer data packet.

The data packet updating module 1206 is configured to take an address of an acceleration server associated with the application client as an updated access address of the network layer data packet, and add the original access address to a header of the data segment to obtain an updated data packet.

The data packet transmission module 1208 is configured to transmit the updated data packet to the acceleration server to cause the acceleration server to access, based on an original access address in a data header, an application server indicated by the original access address and cause the acceleration server to backhaul a response data packet fed back by the application server to the application client.

In an embodiment, the accelerated data transmission apparatus further includes a data packet resolution module.

The data packet resolution module is configured to resolve the network layer data packet to determine a category of a transport layer protocol. The data packet updating module is further configured to take the address of the acceleration server associated with the application client as the updated access address of the network layer data packet, and add the original access address to the header of the data segment to obtain the updated data packet in response to determining the network layer data packet as a data packet to be accelerated based on the category of the transport layer protocol and the original access address.

In an embodiment, the accelerated data transmission apparatus further includes a data packet to be accelerated judgment module including an IP address matching module and a data packet to be accelerated judgment unit.

The IP address matching module is configured to match an access IP address in the original access address with an IP address whitelist when the category of the transport layer protocol is a UDP and it is determined that the network layer data packet is not a domain name resolution request packet. The data packet to be accelerated judgment unit is configured to determine that the network layer data packet is a data packet to be accelerated when an IP address successfully matching exists in the IP address whitelist.

In an embodiment, the data packet transmission module is further configured to determine that the network layer data packet is a non-accelerated data packet when no IP address successfully matching exists in the IP address whitelist; and perform data packet transmission according to an access address in the non-accelerated data packet.

In an embodiment, the data packet transmission module is further configured to perform data packet transmission according to the access address in the non-accelerated data packet in response to determining, based on an IP address blacklist matching the application client, that an access IP address in the non-accelerated data packet is not a black IP address.

In an embodiment, the accelerated data transmission apparatus further includes a process termination module configured to terminate a transmission process of the non-accelerated data packet in response to determining, based on the IP address blacklist matching the application client, that the access IP address in the non-accelerated data packet is a black IP address.

In an embodiment, the accelerated data transmission apparatus further includes a domain name resolution request packet judgment unit configured to perform, when the category of the transport layer protocol is a UDP, port resolution on a UDP data packet obtained by resolution to determine an access port in the UDP data packet; and determine, according to a relationship between the access port and a target port corresponding to a domain name resolution service, whether the network layer data packet is a domain name resolution request packet.

In an embodiment, the domain name resolution request packet judgment unit is further configured to compare the access port with the target port corresponding to the domain name resolution service; determine, when the access port is the same as the target port corresponding to the domain name resolution service, that the network layer data packet is a domain name resolution request packet; and determine, when the access port is different from the target port corresponding to the domain name resolution service, that the network layer data packet is not a domain name reso- lution request packet.

In an embodiment, the accelerated data transmission apparatus further includes a domain name acquisition mod- ule, a domain name resolution result acquisition module, and an IP address whitelist updating module.

The domain name acquisition module is configured to acquire a domain name to be resolved from the data segment when the network layer data packet is a domain name resolution request packet. The domain name resolution result acquisition module is configured to perform domain name resolution on the domain name to obtain an IP address corresponding to the domain name. The IP address whitelist updating module is configured to add the IP address to the IP address whitelist when the domain name meets a domain name acceleration condition.

In an embodiment, the domain name resolution result acquisition module includes a domain name resolution request packet updating module and a resolution result receiving module.

The domain name resolution request packet updating module is configured to update an access address in the domain name resolution request packet to an address cor- responding to a preset domain name server, and transmit the domain name resolution request packet with the updated access address to the domain name server. The resolution result receiving module is configured to receive the IP address returned after the domain name server resolves the domain name in the domain name resolution request packet.

In an embodiment, the data packet to be accelerated judgment module is further configured to match an original access IP address in the original access address with an IP address whitelist when the category of the transport layer protocol is a TCP; and determine that the network layer data packet is a data packet to be accelerated when an IP address successfully matching exists in the IP address whitelist.

In an embodiment, the data packet updating module is further configured to forward the network layer data packet to a local server created by an acceleration client in response to identifying the network layer data packet and determining that the category of the transport layer protocol is a TCP; and take, based on the local server, an address of an acceleration server associated with the application client as an updated access address of the network layer data packet, and add the original access address to a header of the data segment to obtain an updated data packet. The data packet transmission module is further configured to transmit the updated data packet to the acceleration server based on the local server.

In an embodiment, the accelerated data transmission apparatus further includes an address addition module. The address addition module is configured to add the address of the acceleration server associated with the application client and the original access address to a TCP data list. The data packet updating module includes a data list reverse-query unit and a data packet updating unit. The data list reverse-query unit is configured to reversely query the TCP data list based on the local server to obtain the address of the acceleration server and the original access address. The data packet updating unit is configured to take, based on the local server, the address of the acceleration server as the updated access address of the network layer data packet, and add the original access address to the header of the data segment to obtain the updated data packet.

In an embodiment, the original access address includes an original access IP address and an original access port. The data packet resolution module is further configured to resolve the network layer data packet to obtain the original access IP address and a transport layer data packet; and resolve the transport layer data packet to obtain the original access port and the data segment.

In an embodiment, the accelerated data transmission apparatus further includes a response data packet backhaul module. The response data packet backhaul module is configured to receive a response data packet backhauled by the acceleration server, the response data packet being fed back to the acceleration server by the application server, update a source address of the response data packet to an address of the application server, and feed back the response data packet with the updated source address to the applica- tion client through the virtual network device.

In an embodiment, the application to be accelerated is a game to be accelerated. The accelerated data transmission apparatus further includes a region server determination module, a target node determination module, and an accel- eration server determination module.

The region server determination module is configured to determine, in response to a selection operation for a game to be accelerated in a candidate game list, a geographical region where a game server of the game to be accelerated is located. The target node determination module is configured to determine, based on respective speed measurement results of candidate server nodes matching the geographical region, a target node in the candidate server nodes that meets a speed measurement condition. The acceleration server determina- tion module is configured to determine an acceleration server deployed on the target node as the acceleration server associated with the application client.

For a specific embodiment of the accelerated data trans- mission apparatus, refer to the embodiment of the acceler- ated data transmission method above. Details are not described herein again. The modules in the foregoing accel- erated data transmission apparatus may be implemented entirely or partially by software, hardware, or a combination thereof. The foregoing modules may be built in or indepen- dent of a processor of a computer device in a hardware form, or may be stored in a memory of the computer device in a software form, so that the processor invokes and performs operations corresponding to the foregoing modules.

In an embodiment, a computer device is provided. The computer device may be a terminal, and an internal structure diagram thereof may be shown in FIG. 13. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer-readable instruction. The internal memory provides an environment for running the operating system and the computer-readable instruction in the non-volatile storage medium. The communication interface of the computer device is configured to communicate with an external terminal in a wired or wireless manner. The wireless manner may be implemented through Wi-Fi, a carrier network, near field communication (NFC), or another technology. The computer-readable instruction is executed by the processor to perform an accelerated data transmission method. The display screen of the computer device may be a liquid crystal display screen or an e-ink display screen. The input apparatus of the computer device may be a touch layer covering the display screen, or may be a key, a trackball, or a touchpad disposed on a housing of the computer device, or may be an external keyboard, a touchpad, a mouse or the like.

Figure 13:
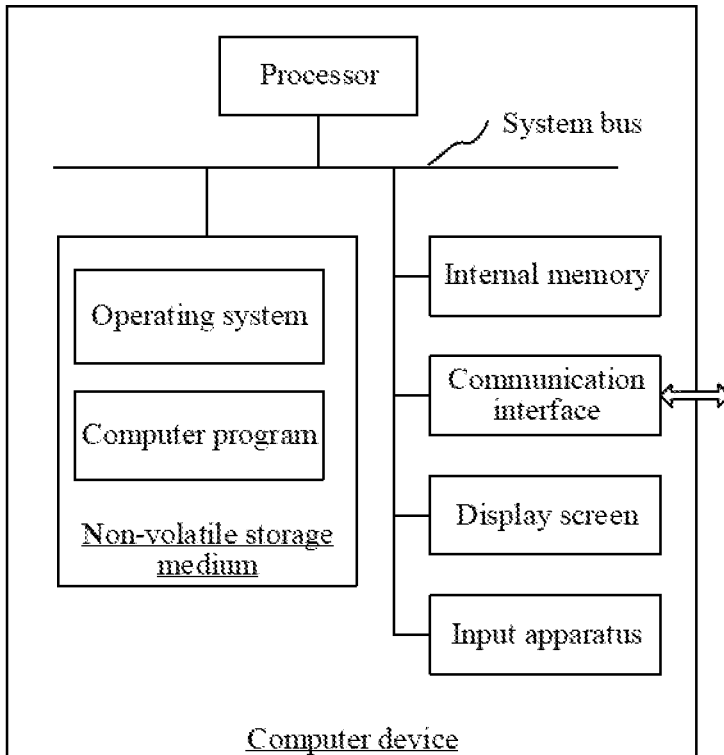
FIG. 13 is a diagram of an internal structure of a computer device according to an embodiment.

A person skilled in the art may understand that the structure shown in FIG. 13 is merely a block diagram of a partial structure related to a solution in this application, and does not constitute a limitation on the computer device to which the solution in this application is applied. In one embodiment, the computer device may include more components or fewer components than those shown in the figure, or some components may be combined, or a different component deployment may be used.

In an embodiment, a computer device is further provided, including a memory and one or more processors. The memory stores a computer-readable instruction, and the one or more processors implement steps in the foregoing method embodiments when executing the computer-readable instruction.

In an embodiment, a computer-readable storage medium storing a computer-readable instruction is provided. Steps in the foregoing method embodiments are implemented when the computer-readable instruction is executed by one or more processors.

In an embodiment, a computer program product or computer program is provided. The computer program product or computer program includes a computer instruction. The computer instruction is stored in a computer-readable storage medium. One or more processors of a computer device read the computer instruction from the computer-readable storage medium. The one or more processors execute the computer instruction to cause the computer device to perform steps in the foregoing method embodiments.

A person of ordinary skill in the art may understand that all or some of procedures of the method in the foregoing embodiments may be implemented by a computer-readable instruction instructing relevant hardware. The computer-readable instruction may be stored in a non-volatile computer-readable storage medium. When the computer-readable instruction is executed, the procedures of the foregoing method embodiments may be implemented. Any reference to a memory, a storage, a database, or another medium used in the embodiments provided in this application may all include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. As a description instead of a limitation, the RAM may be in a variety of forms, such as a static random access memory (SRAM) or a dynamic random access memory (DRAM).

Technical features of the foregoing embodiments may be combined in different ways. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, which are described specifically and in detail, but cannot be construed as a limitation on the patent scope of the invention. For a person of ordinary skill in the art, several transformations and improvements can be made without departing from the idea of this application. These transformations and improvements belong to the protection scope of this application. Therefore, the protection scope of the patent of this application shall be subject to the appended claims.

What is claimed is:

1. An accelerated data transmission method, performed by one or more processors, the method comprising:

routing a data packet transmitted by an application client of an application to be accelerated to a virtual network device based on a routing table configured for the application to be accelerated;

retrieving a network layer data packet from the virtual network device, and identifying an original access address and a data segment in the network layer data packet;

acquiring a domain name to be resolved from the data segment when the network layer data packet is a domain name resolution request packet;

performing domain name resolution on the domain name to obtain an IP address corresponding to the domain name;

adding the IP address to an IP address whitelist when the domain name meets a domain name acceleration condition, inclusion of the IP address in the IP address whitelist designating data packets associated with the IP address for accelerated data transmission;

taking an address of an acceleration server associated with the application client as an updated access address of the network layer data packet, and adding the original access address to the data segment to obtain an updated network layer data packet; and transmitting the updated network layer data packet to the acceleration server the acceleration server accessing an application server corresponding to the original access address; and sending a response data packet returned by the acceleration server to the application client.

2. The method according to claim 1, wherein the method further comprises:

identifying the network layer data packet to determine a category of a transport layer protocol; and in response to determining the network layer data packet as a data packet to be accelerated based on the category of the transport layer protocol and the original access address, adding the original access address to the data segment to obtain the updated network layer data packet.

3. The method according to claim 2, wherein the method further comprises:

matching an access IP address in the original access address with the IP address whitelist when the category of the transport layer protocol is a user datagram protocol (UDP) and the network layer data packet is not a domain name resolution request packet; and determining that the network layer data packet is a data packet to be accelerated when an IP address matches an address in the IP address whitelist.

4. The method according to claim 3, wherein the method further comprises:

determining that the network layer data packet is a non-accelerated data packet when the IP address does not have a match in the IP address whitelist; and performing data packet transmission according to an access address in the non-accelerated data packet.

5. The method according to claim 4, wherein the performing data packet transmission according to an access address in the non-accelerated data packet comprises:

performing data packet transmission according to the access address in the non-accelerated data packet in response to determining that an access IP address in the non-accelerated data packet is not a black IP address based on an IP address blacklist.

6. The method according to claim 5, wherein the method further comprises:

terminating a transmission process of the non-accelerated data packet in response to determining that the access IP address in the non-accelerated data packet is a black IP address based on the IP address blacklist.

7. The method according to claim 3, wherein the method further comprises:

performing port resolution on a UDP data packet obtained by resolution to determine an access port in the UDP data packet when the category of the transport layer protocol is a UDP; and determining whether the network layer data packet is a domain name resolution request packet according to a relationship between the access port and a target port corresponding to a domain name resolution service.

8. The method according to claim 7, wherein the determining whether the network layer data packet is a domain name resolution request packet comprises:

comparing the access port with the target port corresponding to the domain name resolution service;

determining that the network layer data packet is a domain name resolution request packet, when the access port is the same as the target port corresponding to the domain name resolution service; and determining that the network layer data packet is not a domain name resolution request packet, when the access port is different from the target port corresponding to the domain name resolution service.

9. The method according to claim 3, wherein the performing domain name resolution on the domain name to obtain an IP address corresponding to the domain name comprises:

updating an access address in the domain name resolution request packet to an address corresponding to a preset domain name server, and transmitting the domain name resolution request packet with the updated access address to the domain name server; and receiving the IP address returned after the domain name server resolves the domain name in the domain name resolution request packet.

10. The method according to claim 2, wherein the method further comprises:

matching an original access IP address in the original access address with the IP address whitelist when the category of the transport layer protocol is a transmission control protocol (TCP); and determining that the network layer data packet is a data packet to be accelerated when an IP address successfully matching exists in the IP address whitelist.

11. The method according to claim 1, further comprising:

forwarding the network layer data packet to a local server created by an acceleration client in response to identifying the network layer data packet and determining that the category of the transport layer protocol is a TCP; and taking, based on the local server, the address of the acceleration server associated with the application client as the updated access address of the network layer data packet, and adding the original access address to the data segment to obtain the updated network layer data packet; and transmitting the updated network layer data packet to the acceleration server based on the local server.

12. The method according to claim 11, wherein the method further comprises:

adding the address of the acceleration server associated with the application client and the original access address to a TCP data list; and the taking, based on the local server, the address of the acceleration server associated with the application client as the updated access address of the network layer data packet, and adding the original access address to the data segment to obtain the updated network layer data packet comprises:

reversely querying the TCP data list based on the local server to obtain the address of the acceleration server and the original access address; and taking, based on the local server, the address of the acceleration server as the updated access address of the network layer data packet, and adding the original access address to the data segment to obtain the updated network layer data packet.

13. The method according to claim 1, wherein the original access address comprises an original access IP address and an original access port; and the identifying an original access address and a data segment in the network layer data packet comprises:

identifying the network layer data packet to obtain the original access IP address and a transport layer data packet; and identifying the transport layer data packet to obtain the original access port and the data segment.

14. The method according to claim 1, wherein the sending a response data packet returned by the acceleration server to the application client comprises:

receiving a response data packet returned by the acceleration server, the response data packet being sent to the acceleration server by the application server; and updating a source address of the response data packet to an address of the application server, and sending the response data packet with the updated source address to the application client through the virtual network device.

15. The method according to claim 1, wherein the application to be accelerated is a game to be accelerated; and the method further comprises:

determining a geographical region where a game server of the game to be accelerated is located in response to a selection operation for a game to be accelerated;

determining candidate server nodes that match the geographical region;

determining a target node in the candidate server nodes that meets a speed measurement condition based on respective speed measurement results of the candidate server nodes; and determining an acceleration server deployed on the target node as the acceleration server associated with the application client.

16. A computer device, comprising a memory and one or more processors, the memory storing a computer program, the one or more processors implementing steps of an accelerated data transmission method, performed by a computer device, the method comprising:

routing a data packet transmitted by an application client of an application to be accelerated to a virtual network device based on a routing table configured for the application to be accelerated;

retrieving a network layer data packet from the virtual network device, and identifying an original access address and a data segment in the network layer data packet;

acquiring a domain name to be resolved from the data segment when the network layer data packet is a domain name resolution request packet;

performing domain name resolution on the domain name to obtain an IP address corresponding to the domain name;

adding the IP address to an IP address whitelist when the domain name meets a domain name acceleration condition, inclusion of the IP address in the IP address whitelist designating data packets associated with the IP address for accelerated data transmission;

taking an address of an acceleration server associated with the application client as an updated access address of the network layer data packet, and adding the original access address to the data segment to obtain an updated network layer data packet; and transmitting the updated network layer data packet to the acceleration server, the acceleration server accessing an application server corresponding to the original access address, and sending a response data packet returned by the acceleration server to the application client.

17. The computer device according to claim 16, wherein the method further comprises:

identifying the network layer data packet to determine a category of a transport layer protocol; and in response to determining the network layer data packet as a data packet to be accelerated based on the category of the transport layer protocol and the original access address, adding the original access address to the data segment to obtain the updated network layer data packet.

18. A non-transitory computer-readable storage medium, storing a computer program, an accelerated data transmission method, performed when the computer program is executed by one or more processors, the method comprising:

routing a data packet transmitted by an application client of an application to be accelerated to a virtual network device based on a routing table configured for the application to be accelerated;

retrieving a network layer data packet from the virtual network device, and identifying an original access address and a data segment in the network layer data packet;

acquiring a domain name to be resolved from the data segment when the network layer data packet is a domain name resolution request packet;

performing domain name resolution on the domain name to obtain an IP address corresponding to the domain name;

adding the IP address to an IP address whitelist when the domain name meets a domain name acceleration condition, inclusion of the IP address in the IP address whitelist designating data packets associated with the IP address for accelerated data transmission;

taking an address of an acceleration server associated with the application client as an updated access address of the network layer data packet, and adding the original access address to the data segment to obtain an updated network layer data packet; and transmitting the updated network layer data packet to the acceleration server, the acceleration server accessing an application server corresponding to the original access address in a data header, and sending a response data packet returned by the acceleration server to the application client.

19. The computer-readable storage medium according to claim 18, wherein the method further comprising:

forwarding the network layer data packet to a local server created by an acceleration client in response to identifying the network layer data packet and determining that the category of the transport layer protocol is a TCP; and taking, based on the local server, the address of the acceleration server associated with the application client as the updated access address of the network layer data packet, and adding the original access address to the data segment to obtain the updated network layer data packet; and transmitting the updated network layer data packet to the acceleration server based on the local server.

\* \* \* \* \*